US011906296B1

(12) United States Patent
Qu et al.

(10) Patent No.: US 11,906,296 B1
(45) Date of Patent: Feb. 20, 2024

(54) DISTANCE MEASURING DEVICE AND METHOD

(71) Applicant: Mileseey Technology (US) Inc., City Of Industry, CA (US)

(72) Inventors: Zhangkun Qu, Guangdong (CN); Jianjie Yang, Guangdong (CN); Jiefeng Huang, Guangdong (CN)

(73) Assignee: Mileseey Technology (US) Inc., City Of Industry, CA (US)

( * ) Notice: Subject to any disclaimer, the term of this patent is extended or adjusted under 35 U.S.C. 154(b) by 0 days.

(21) Appl. No.: 18/226,810

(22) Filed: Jul. 27, 2023

(30) Foreign Application Priority Data

Feb. 27, 2023 (CN) .......................... 202310167588.9
Jun. 9, 2023 (CN) .......................... 202321474881.1
Jun. 21, 2023 (CN) .......................... 202321598754.2
Jun. 21, 2023 (CN) .......................... 202321602170.8

(51) Int. Cl.
| | |
|---|---|
| *G01B 3/1089* | (2020.01) |
| *G01B 3/1094* | (2020.01) |
| *G01B 3/1084* | (2020.01) |
| *G01S 7/481* | (2006.01) |
| *G01S 17/08* | (2006.01) |
| *G01S 7/48* | (2006.01) |

(52) U.S. Cl.
CPC ......... *G01B 3/1089* (2020.01); *G01B 3/1094* (2020.01); *G01S 7/4808* (2013.01); *G01S 7/4813* (2013.01); *G01S 17/08* (2013.01); *G01B 2003/1087* (2013.01)

(58) Field of Classification Search
CPC ................ G01B 3/1089; G01B 3/1094; G01B 2003/1087; G01S 7/4808; G01S 7/4813; G01S 17/08
See application file for complete search history.

(56) References Cited

U.S. PATENT DOCUMENTS

| | | | | |
|---|---|---|---|---|
| 7,600,326 B2 * | 10/2009 | Plucknett | ............. | G01B 3/1084 33/760 |
| 8,266,807 B2 * | 9/2012 | Olsen | ..................... | G01C 15/12 33/286 |
| 9,046,340 B2 * | 6/2015 | Li | ............................ | G01S 17/88 |
| 11,680,783 B2 * | 6/2023 | Pabst | .................... | G01C 15/006 33/760 |
| 2006/0021237 A1 * | 2/2006 | Marshall | ................... | G01C 3/08 33/290 |
| 2009/0056159 A1 * | 3/2009 | Plucknett | ............. | G01B 3/1084 33/760 |
| 2012/0036727 A1 * | 2/2012 | McCarthy | ............ | G01B 3/1003 33/760 |
| 2012/0042527 A1 * | 2/2012 | Olsen | ..................... | G01C 15/12 33/286 |
| 2023/0296775 A1 * | 9/2023 | Li | ............................ | G01S 17/86 33/760 |

* cited by examiner

*Primary Examiner* — Yaritza Guadalupe-McCall

(57) ABSTRACT

The present disclosure provides a distance measuring device configured to measure a distance between an initial position and a target position, the distance measuring device includes: a marking assembly configured to generate a mark on the initial position as a first measuring datum and a measuring structure configured to measure the distance between the initial position and the target position according to the first measuring datum. The present disclosure further provides a distance measuring method.

18 Claims, 42 Drawing Sheets

DISTANCE MEASURING DEVICE AND METHOD

CROSS-REFERENCE TO RELATED APPLICATIONS

This application claims priority to following Chinese Patent Applications, Chinese patent application No.: 202310167588.9, entitled DISTANCE MEASURING DEVICE, filed Feb. 27, 2023; Chinese patent application No.: 202321474881.1, entitled DISTANCE MEASURING DEVICE, filed Jun. 9, 2023; Chinese patent application No.: 202321598754.2, entitled Laser Distance Measuring Tape, filed Jun. 21, 2023; Chinese patent application No.: 202321602170.8, entitled Measuring Tape and Braking Device Thereof, filed Jun. 21, 2023; which are incorporated herein by reference for all purposes.

FIELD

The present disclosure relates to a distance measuring device and a method for measuring distance.

BACKGROUND

In many trades and industries there is a need for accurate distance measuring tool. For example, in the construction industry, distance meters are commonly used. Users often need to read the mark on the measuring tape with naked eyes. However, this reading mode is less accurate because the measuring datum and users' vision for each reading is usually inconsistent.

SUMMARY

In a first aspect, the present disclosure provides a distance measuring device configured to measure a distance between an initial position and a target position, the distance measuring device includes: a marking assembly, configured to generate a mark on the initial position as a first measuring datum; and a measuring structure, configured to measure the distance between the initial position and the target position according to the first measuring datum.

In a second aspect, the present disclosure provides a distance measuring device configured to measure a distance between an initial position and a target position, the distance measuring device includes: a battery, a processor, a housing including a front portion, a rear portion and a middle portion; and a measuring structure including a laser ranging assembly and a tape assembly, the laser ranging assembly is substantially arranged in the front portion, the tape assembly is substantially arranged in the middle portion, the battery is substantially arranged in the rear portion, and the laser ranging assembly and the tape assembly are both electrically connected with the processor.

In a third aspect, the present disclosure provides a distance measuring method by the distance measuring device, wherein the distance measuring method includes: generating, by the marking assembly, a mark on the initial position as a first measuring datum; and measuring, by the measuring structure, the distance between the initial position and the target position according to the measuring datum.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

Figure 1:
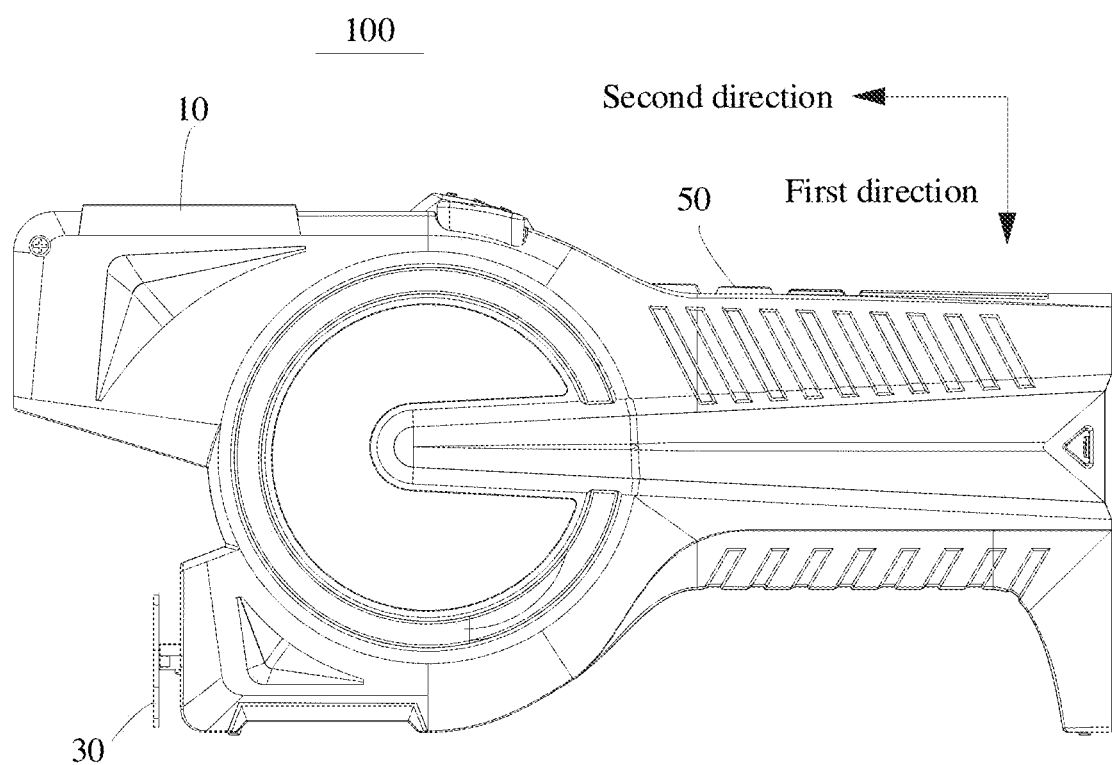
FIG. 1 is a structural schematic diagram of a distance measuring device according to an embodiment of the present disclosure.
Figure 2:
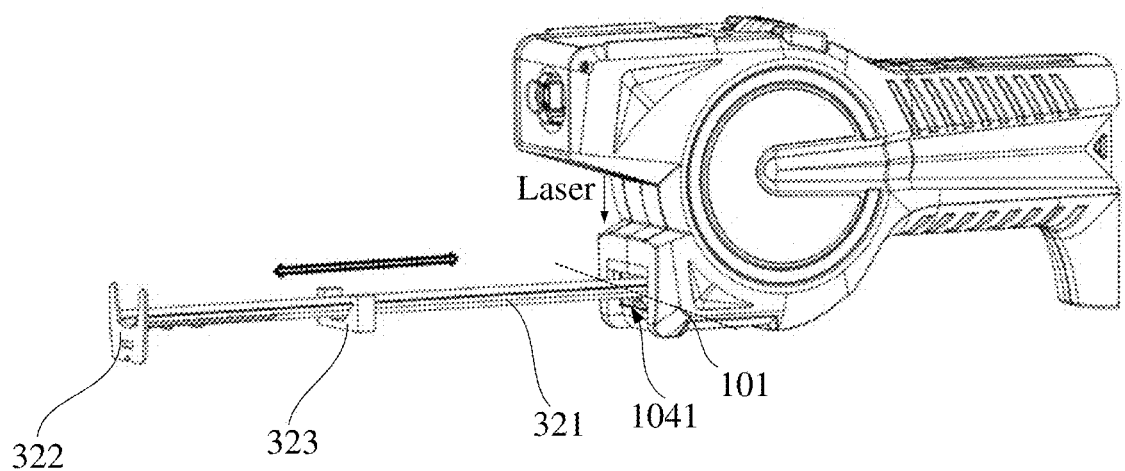
FIG. 2 is a structural schematic diagram of the distance measuring device of FIG. 1, and a tape extends out of a housing of the distance measuring device.
Figure 3:
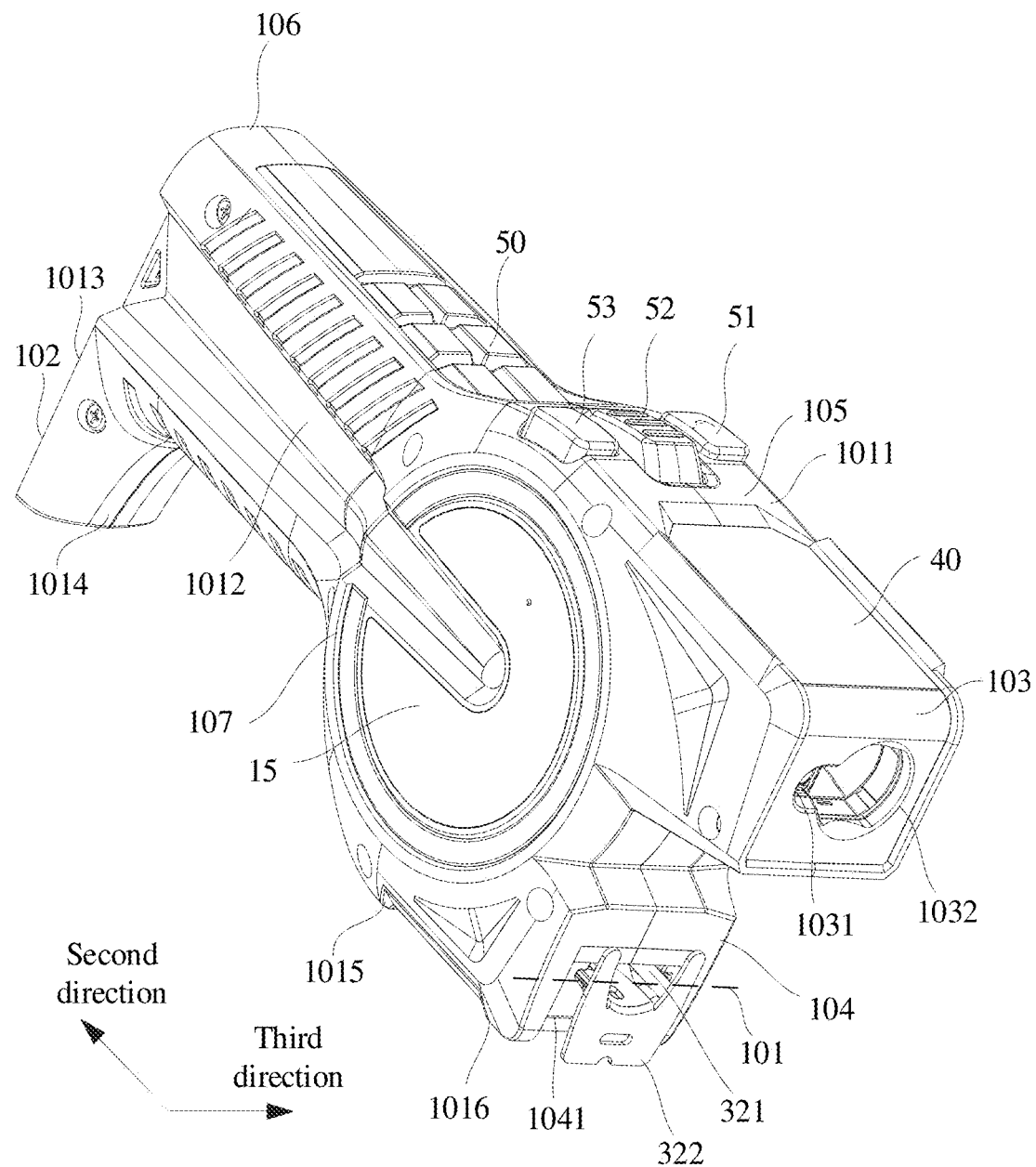
FIG. 3 is another structural schematic diagram of the distance measuring device of FIG. 1.
Figure 4:
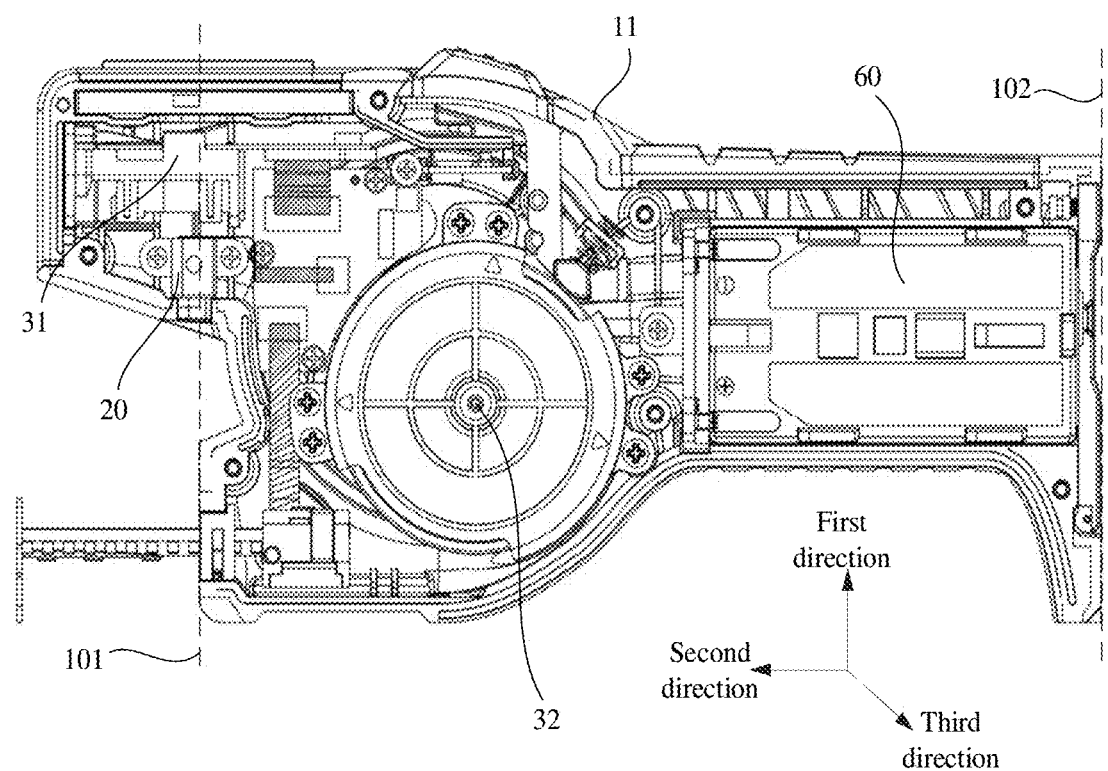
FIG. 4 is a structural schematic diagram of some components of the distance measuring device of FIG. 1.
Figure 5:
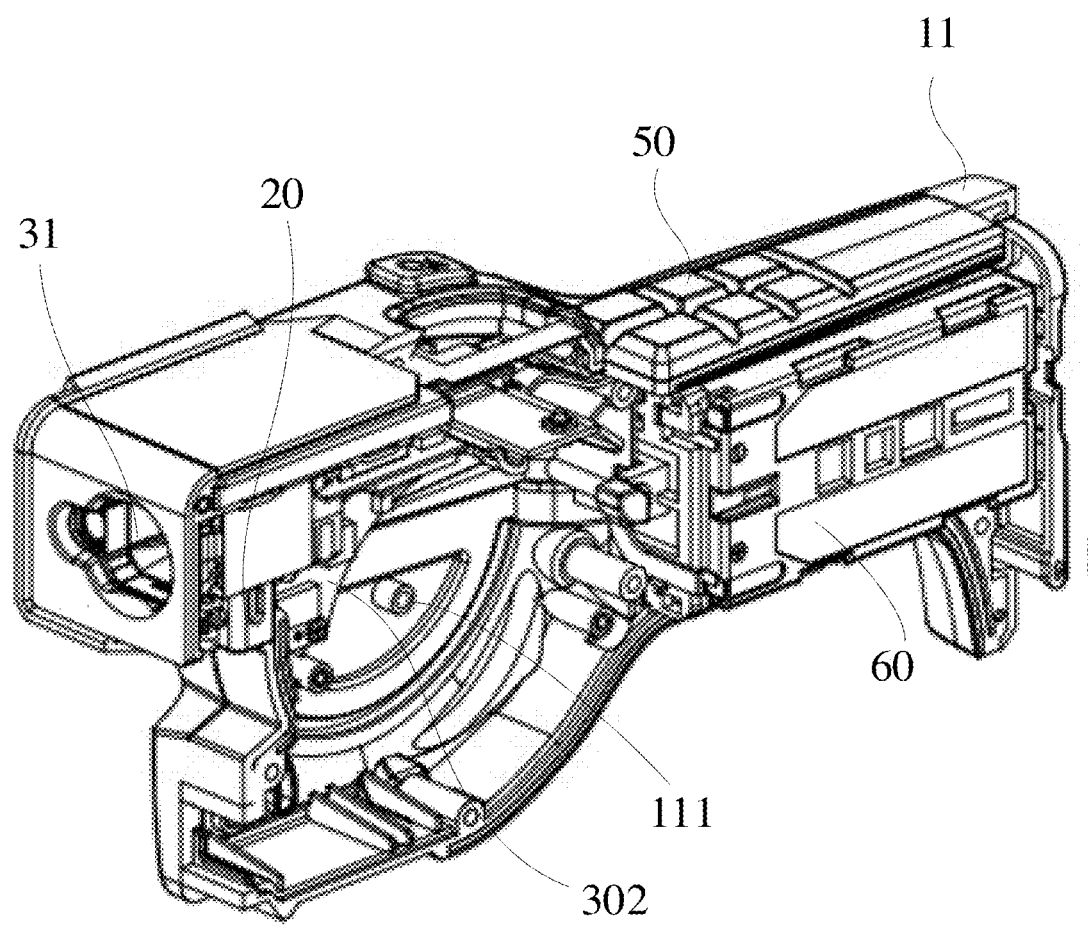
FIG. 5 is a structural schematic diagram of some components of the distance measuring device of FIG. 1.
Figure 6:
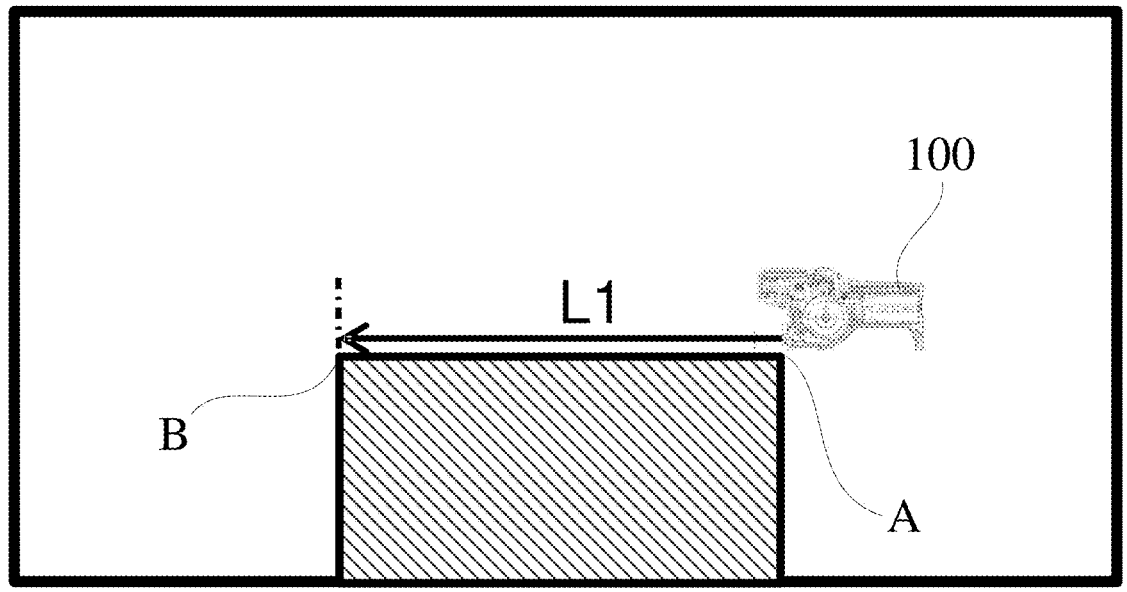
FIG. 6 is a measuring scenario of the distance measuring device of FIG. 1.
Figure 7:
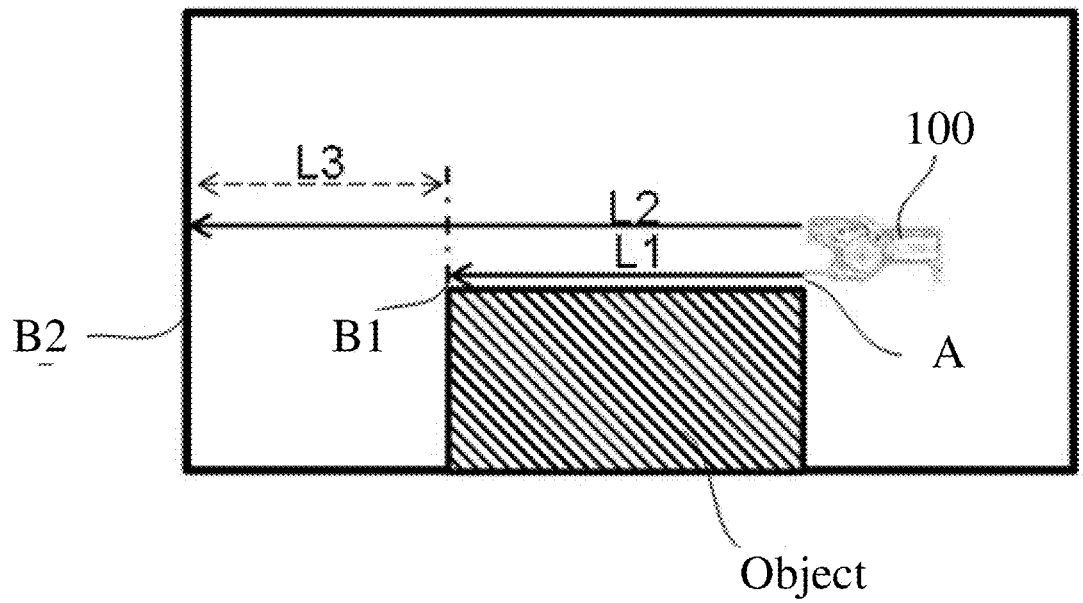
FIG. 7 is another measuring scenario of the distance measuring device of FIG. 1.
Figure 8:
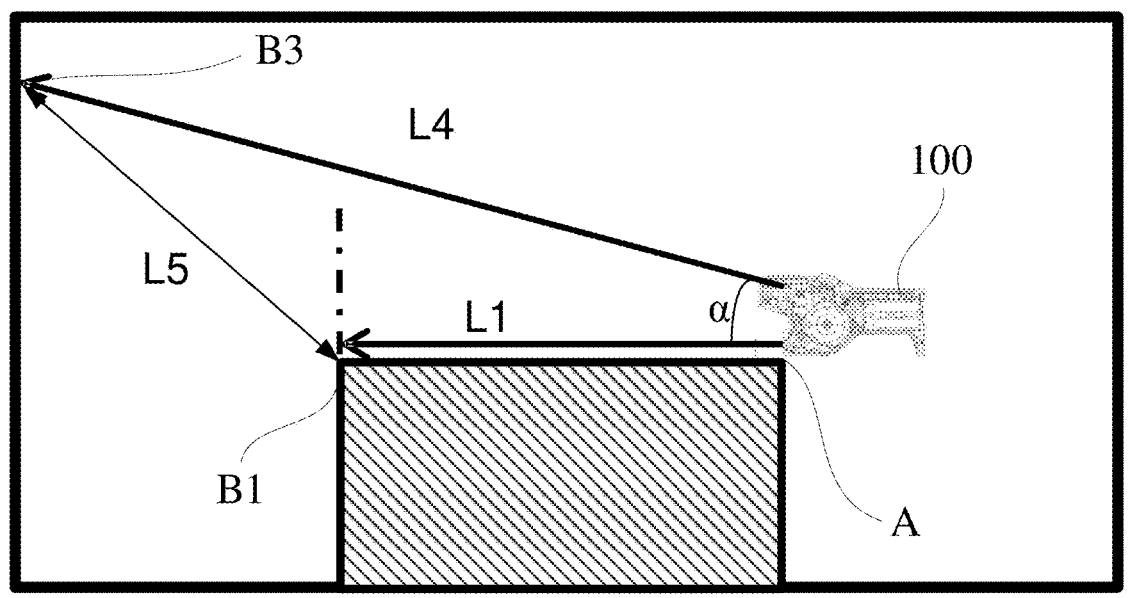
FIG. 8 is a further measuring scenario of the distance measuring device of FIG. 1.
Figure 9:
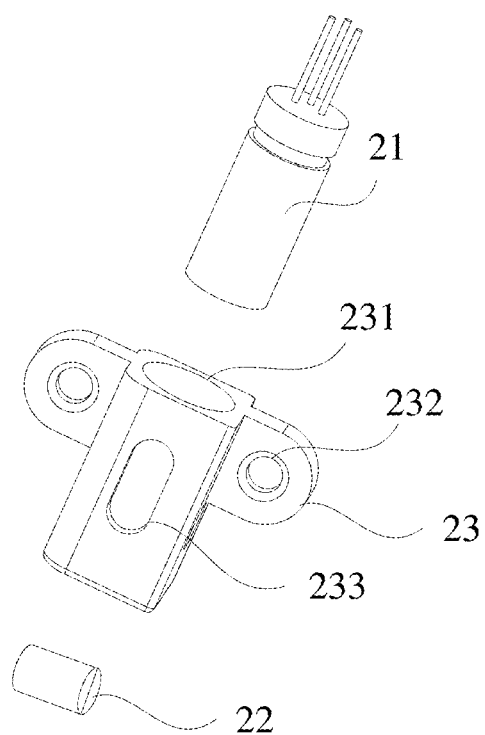
FIG. 9 is a structural schematic diagram of a marking assembly of the distance measuring device of FIG. 1.
Figure 10:
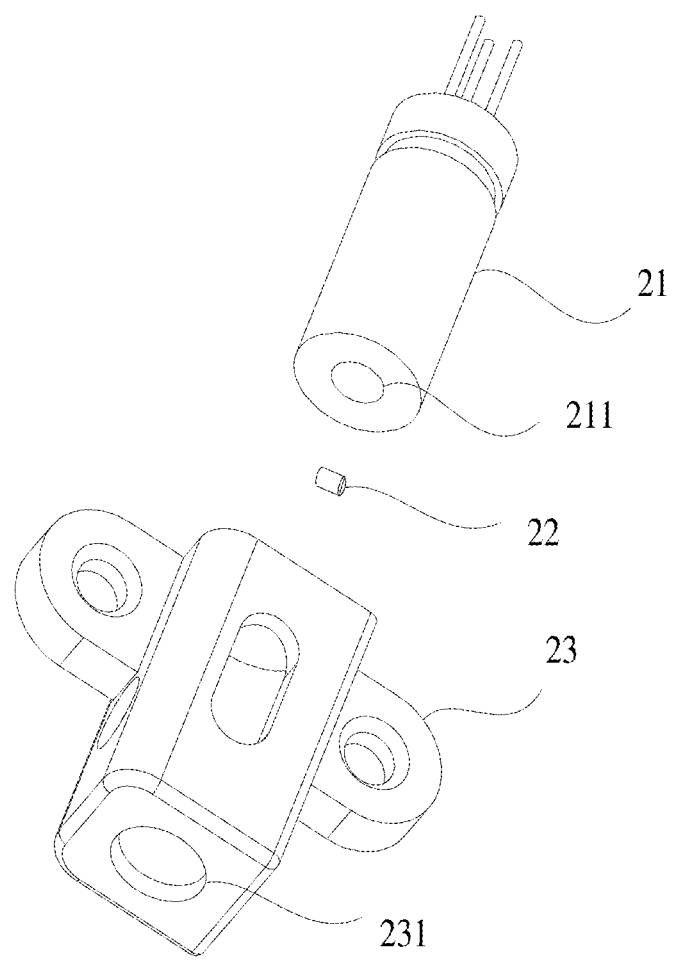
FIG. 10 is a structural schematic diagram of another marking assembly of the distance measuring device of FIG. 1.
Figure 11:
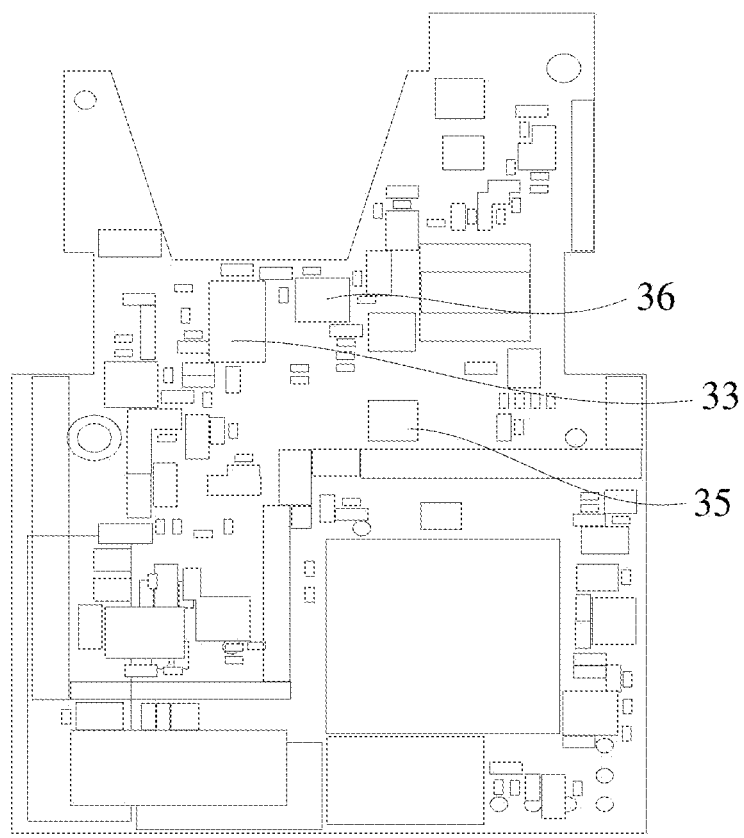
FIG. 11 is a structural schematic diagram of a PCB board of the distance measuring device of FIG. 1.
Figure 12:
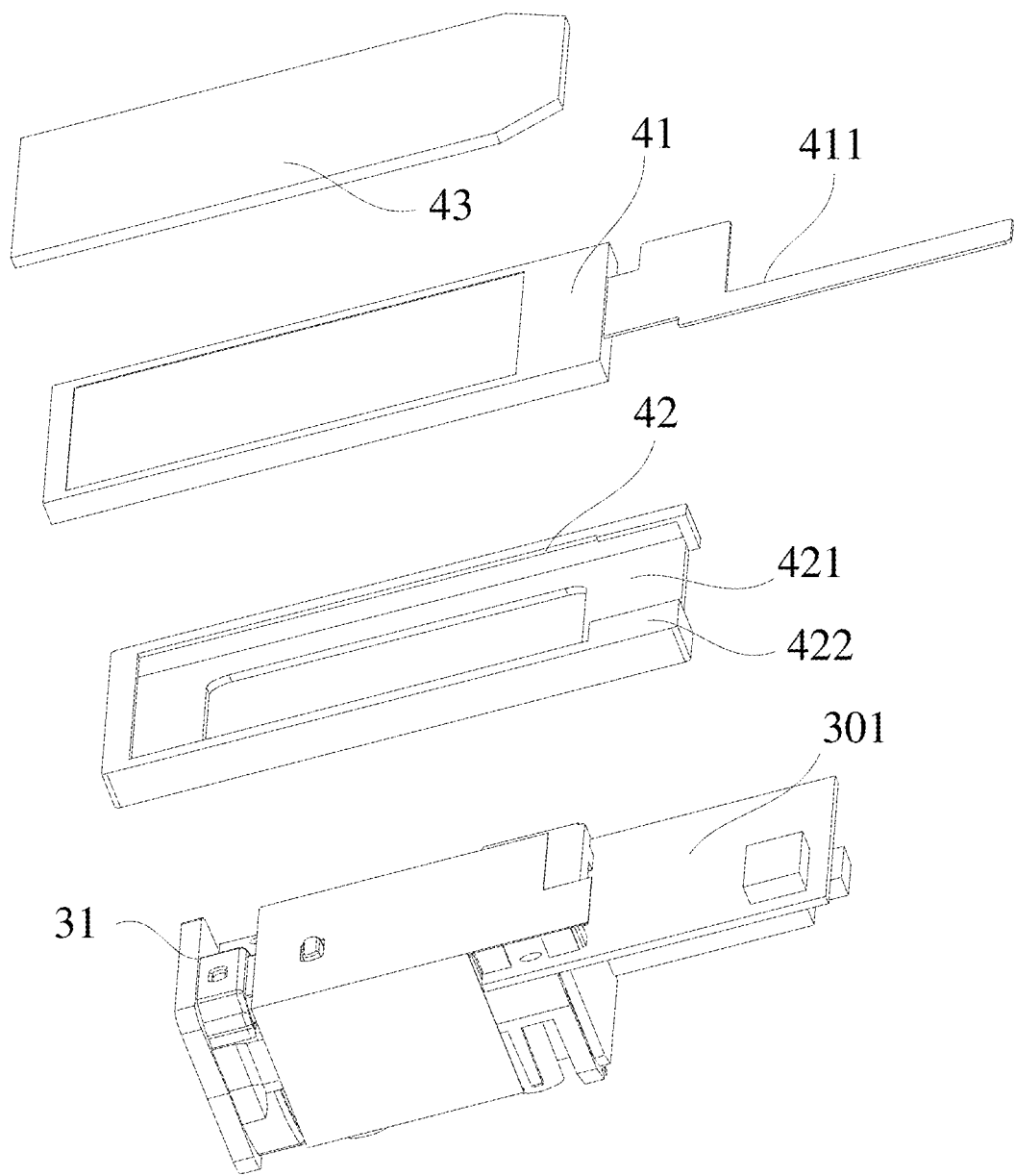
FIG. 12 is a structural schematic diagram of the PCB board, a laser ranging assembly, and a display assembly of the distance measuring device of FIG. 1.
Figure 13:
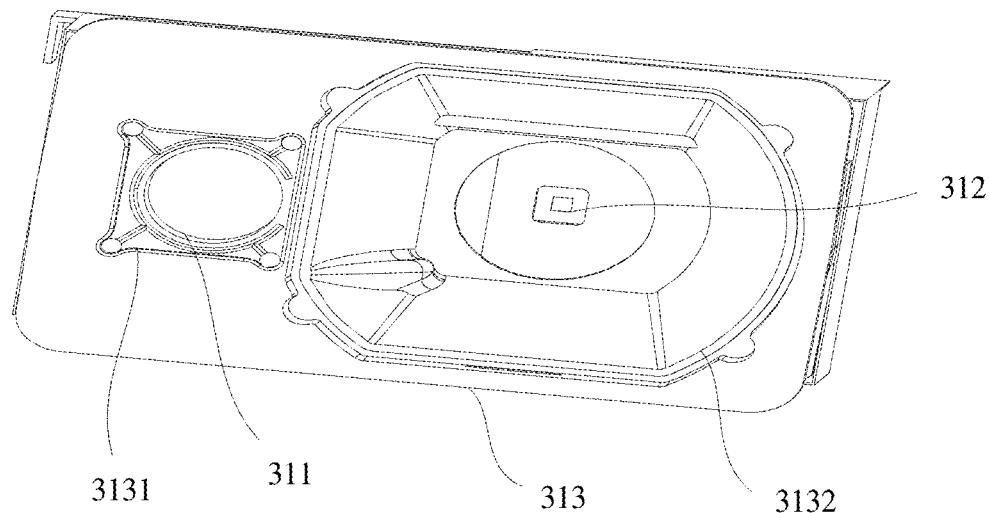
FIG. 13 is a structural schematic diagram of the laser ranging assembly of the distance measuring device of FIG. 1.
Figure 14:
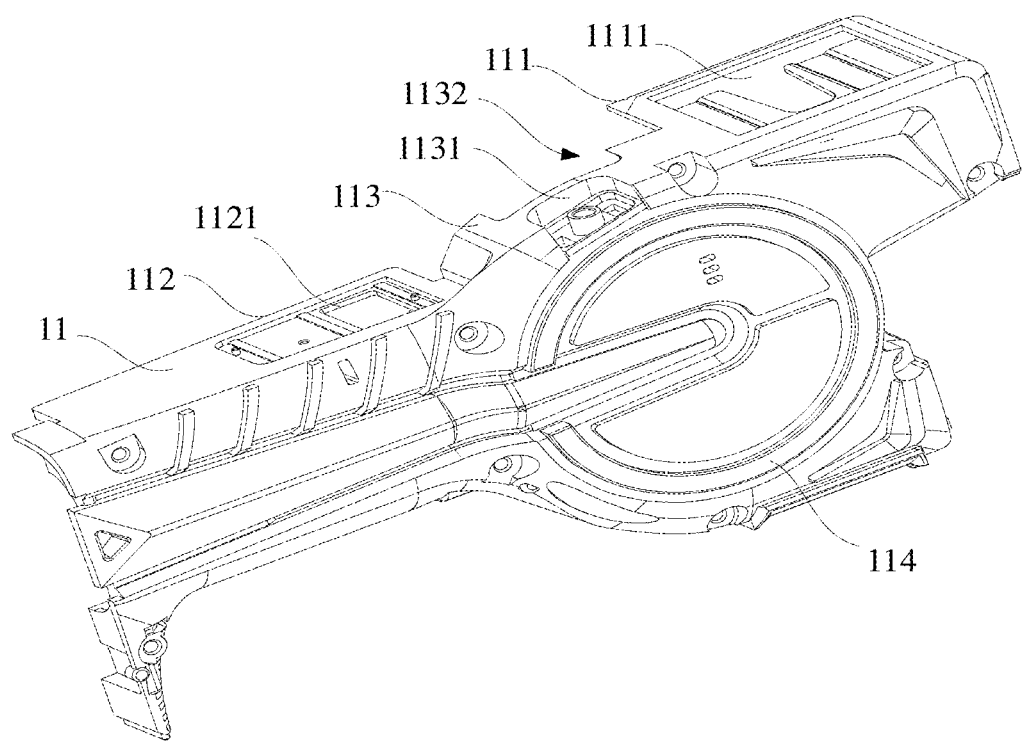
FIG. 14 is a structural schematic diagram of a first sub housing of the distance measuring device of FIG. 1.
Figure 15:
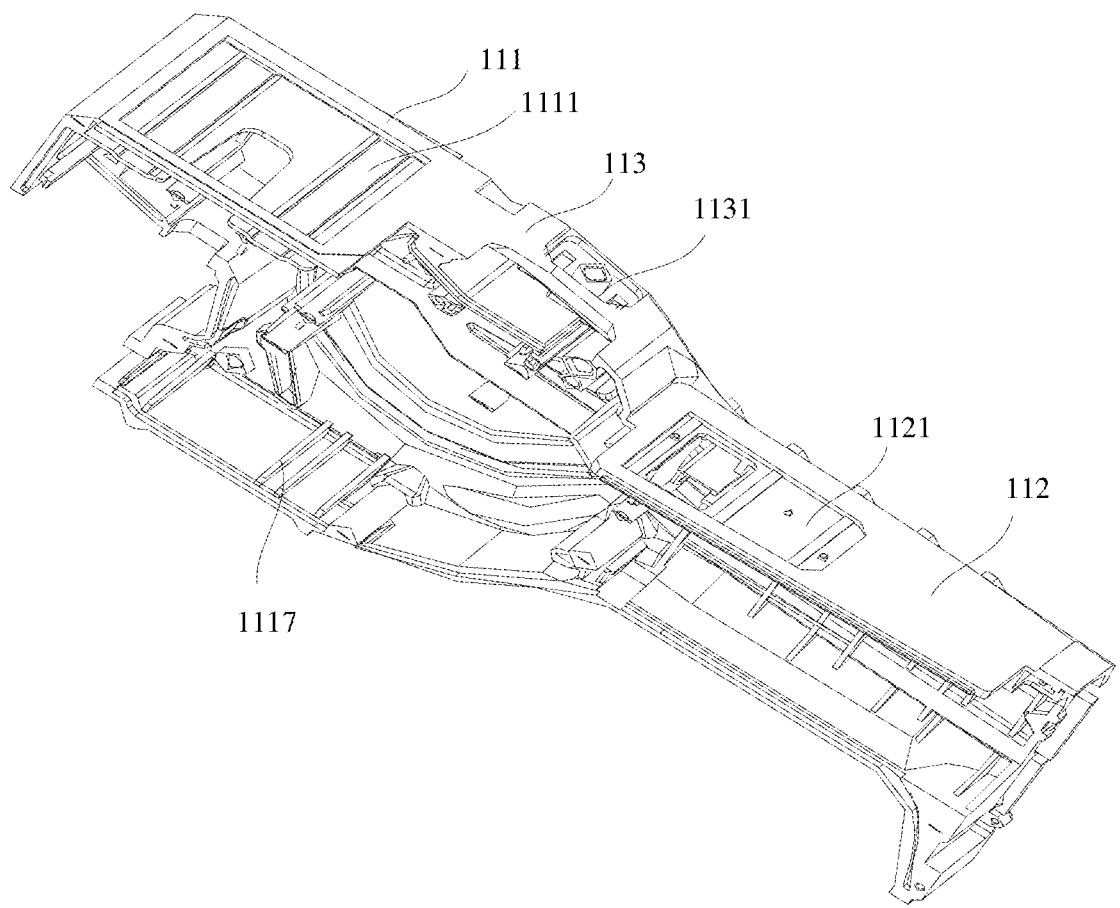
FIG. 15 is another structural schematic diagram of the first sub housing of FIG. 14.
Figure 16:
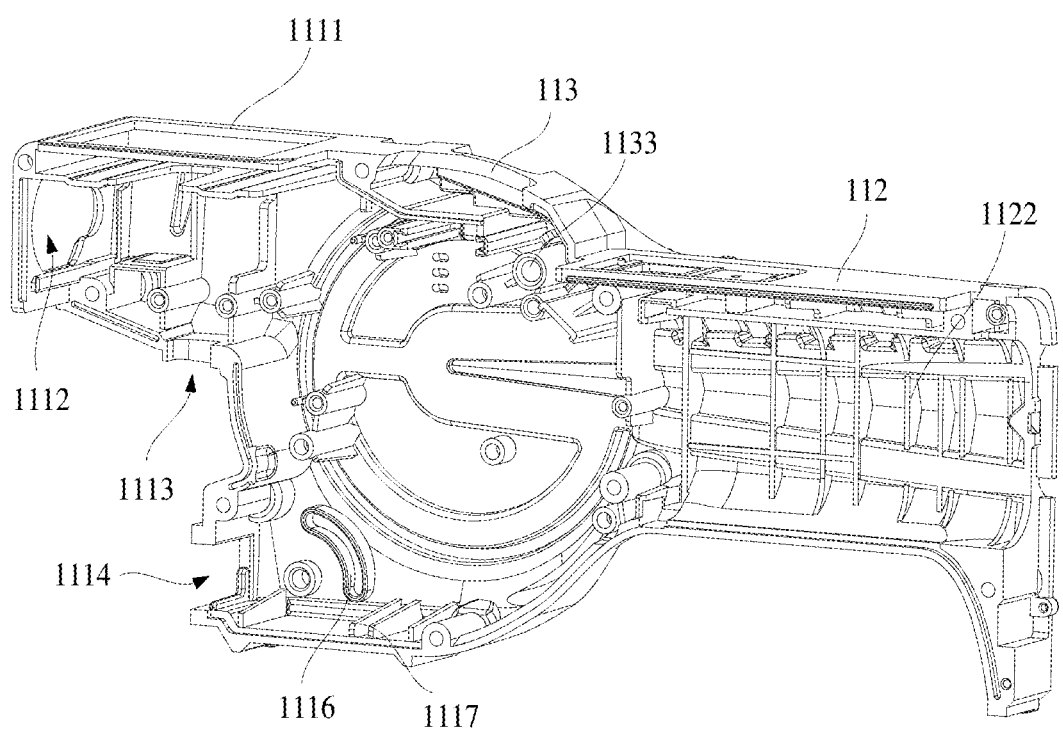
FIG. 16 is a further structural schematic diagram of the first sub housing of FIG. 14.
Figure 17:
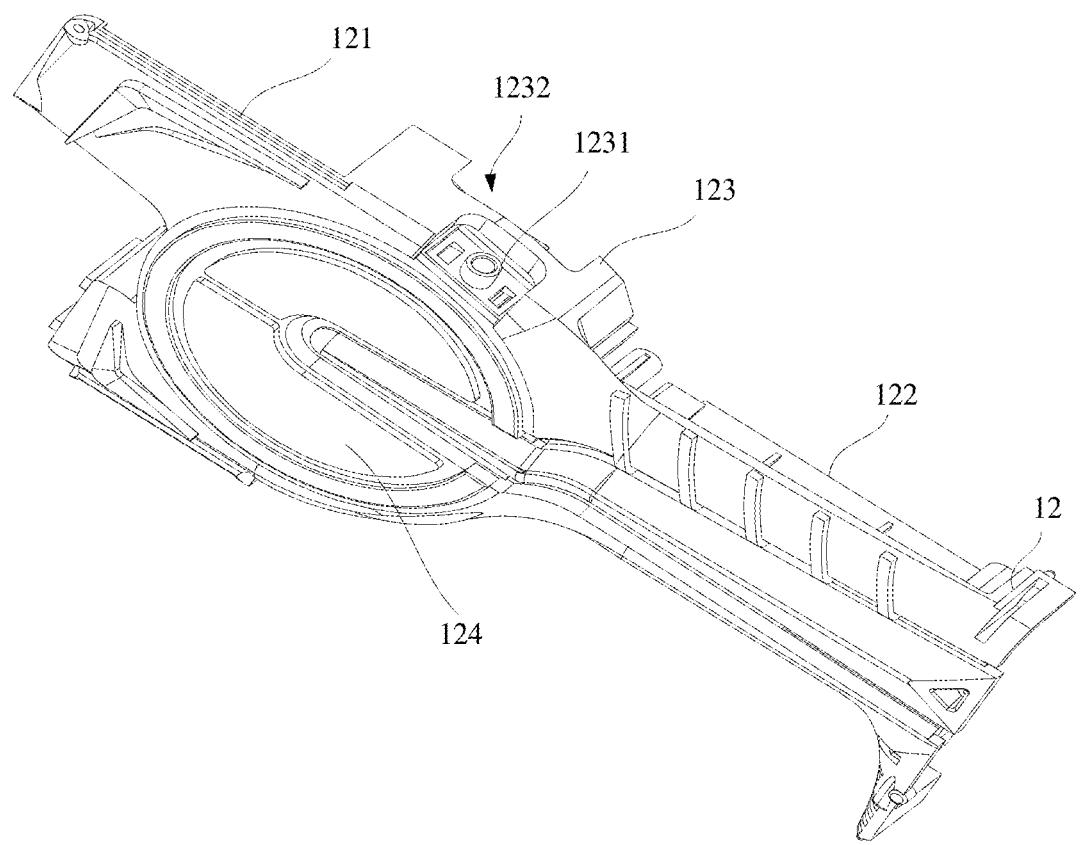
FIG. 17 is a structural schematic diagram of a second sub housing of the distance measuring device of FIG. 1.
Figure 18:
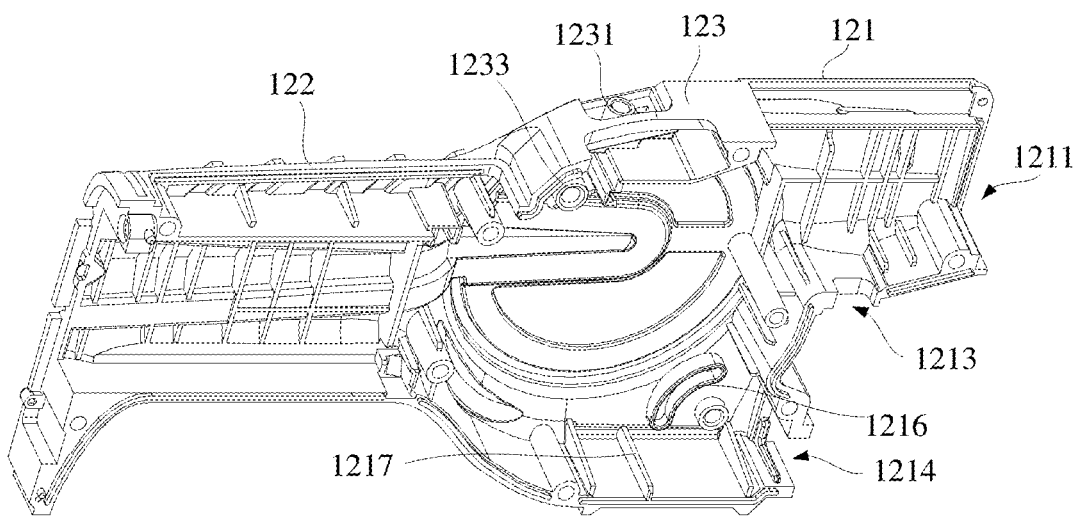
FIG. 18 is another structural schematic diagram of the second sub housing of FIG. 17.
Figure 19:
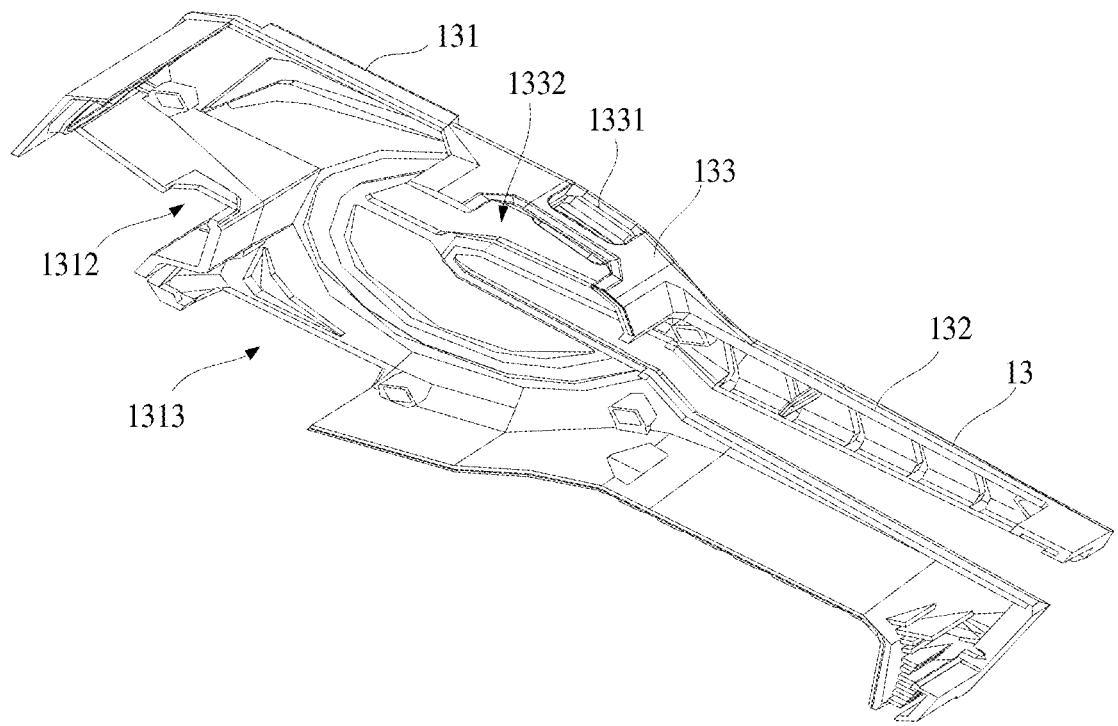
FIG. 19 is a structural schematic diagram of a third sub housing of the distance measuring device of FIG. 1.
Figure 20:
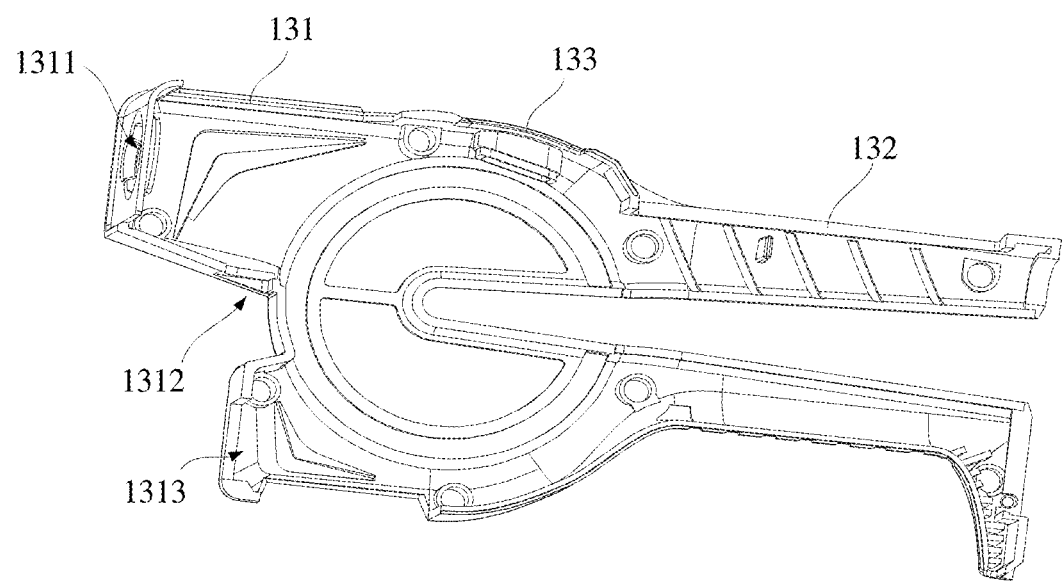
FIG. 20 is another structural schematic diagram of the third sub housing of FIG. 19.
Figure 21:
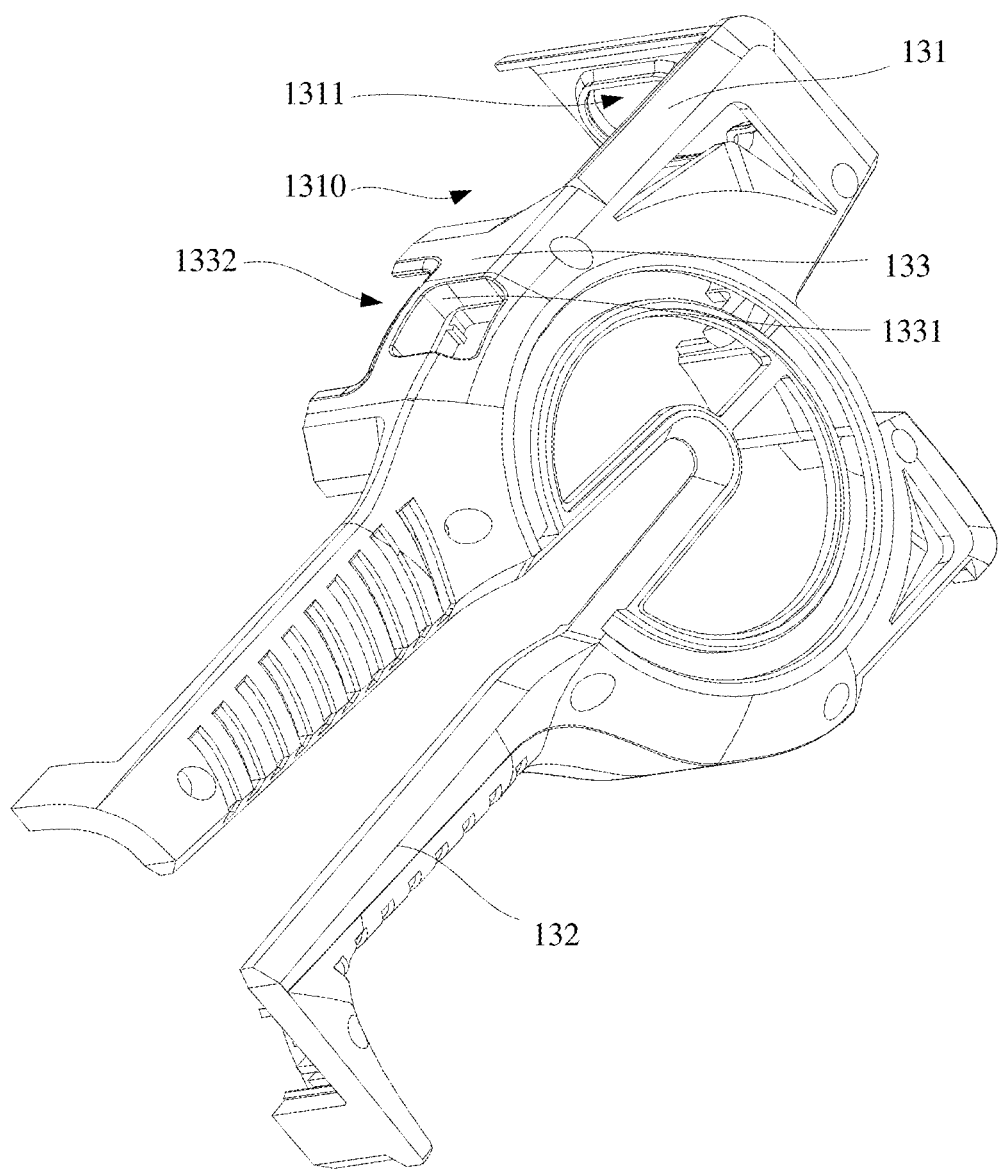
FIG. 21 is a further structural schematic diagram of the third sub housing of FIG. 19.
Figure 22:
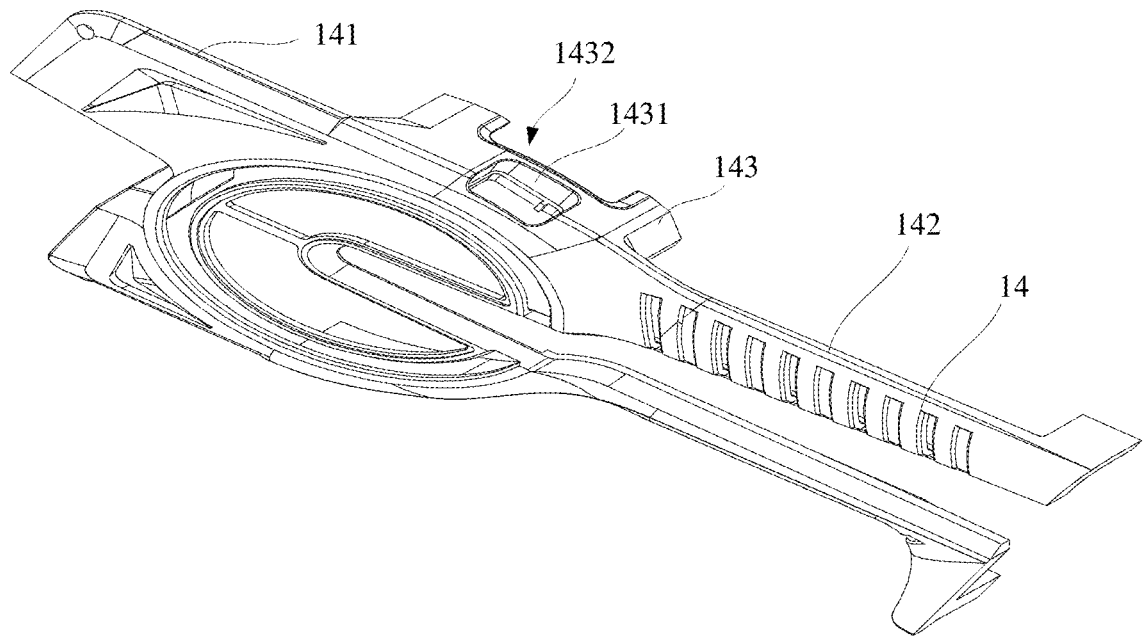
FIG. 22 is a structural schematic diagram of a fourth sub housing of the distance measuring device of FIG. 1.
Figure 23:
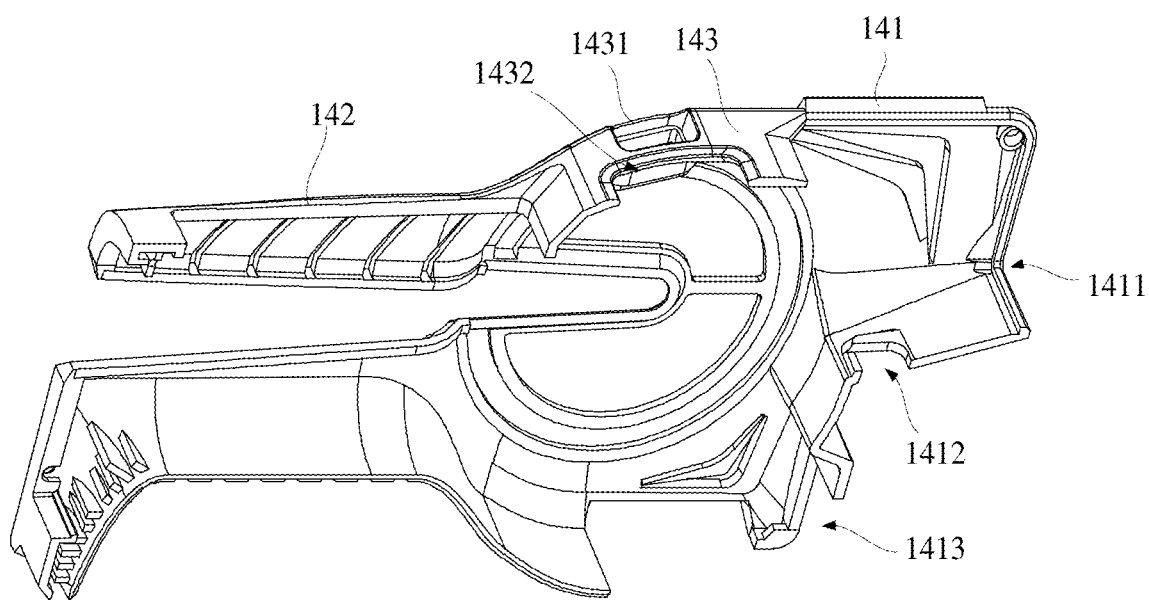
FIG. 23 is another structural schematic diagram of the fourth sub housing of FIG. 22.
Figure 24:
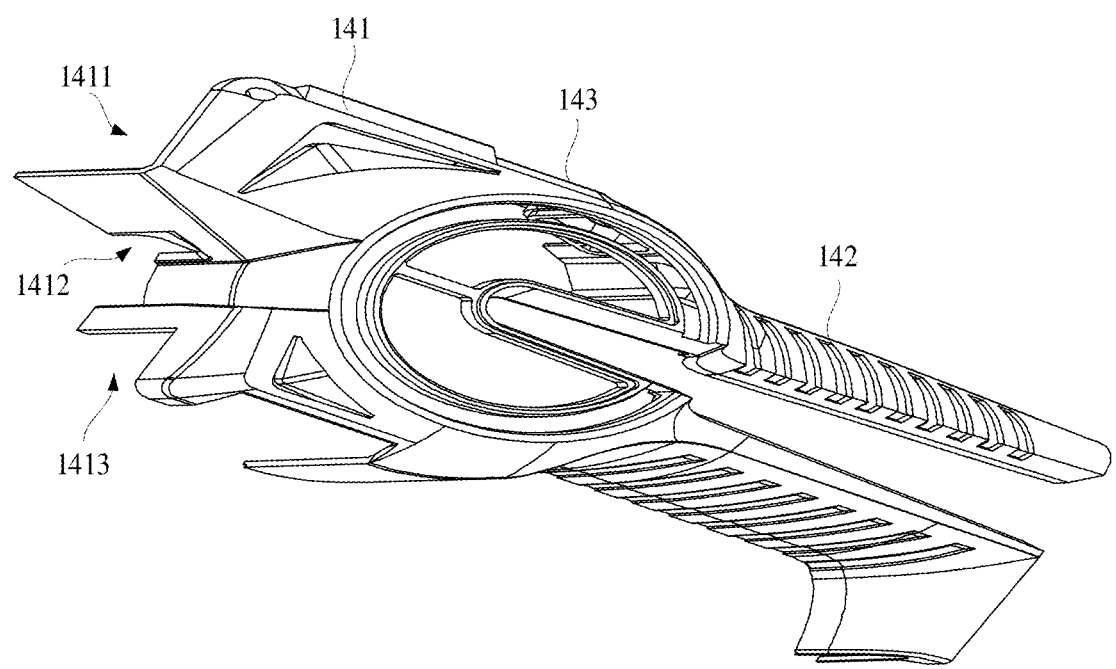
FIG. 24 is a further structural schematic diagram of the fourth sub housing of FIG. 22.
Figure 25:
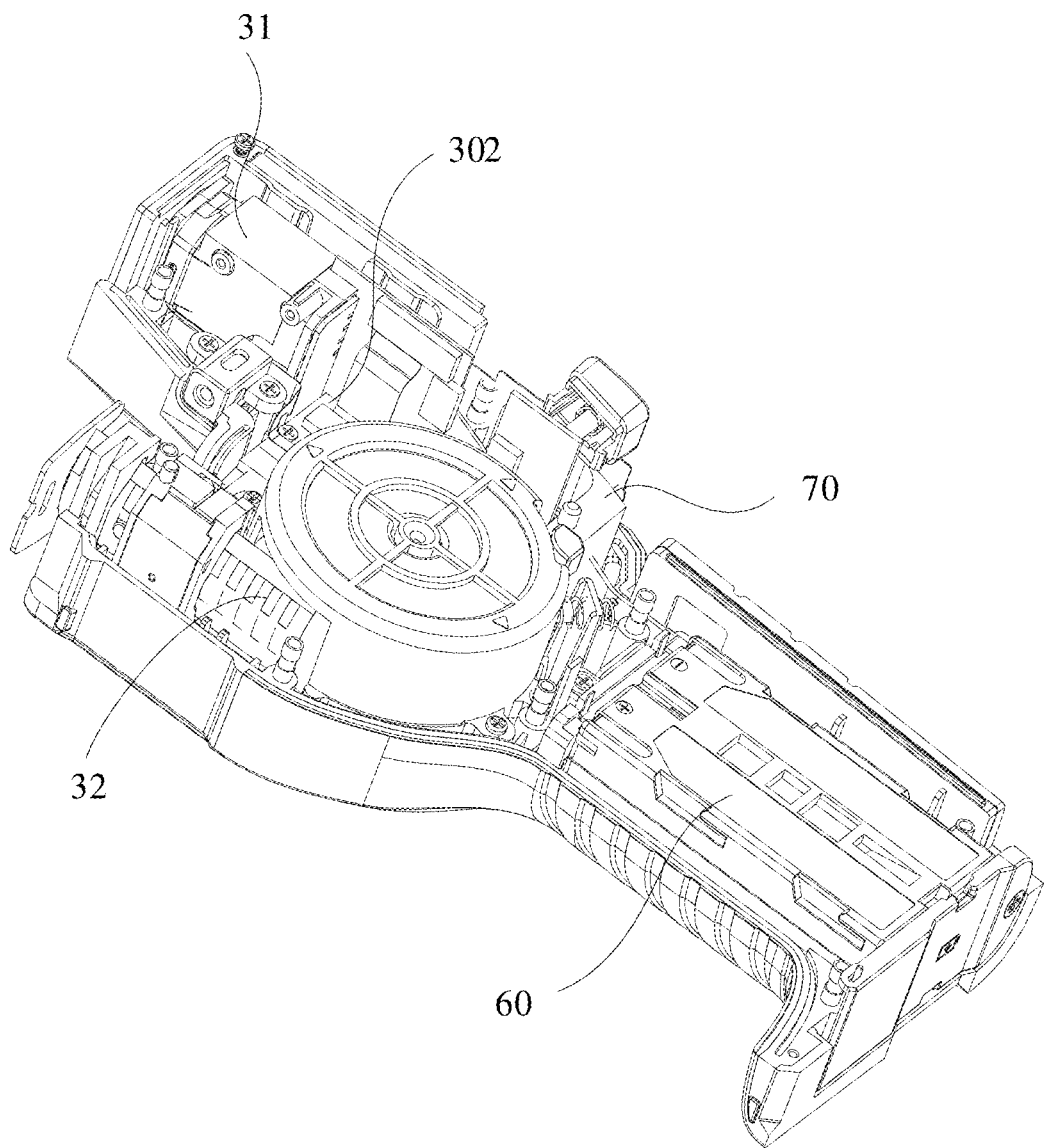
FIG. 25 is a structural schematic diagram of some components of the distance measuring device of FIG. 1.
Figure 26:
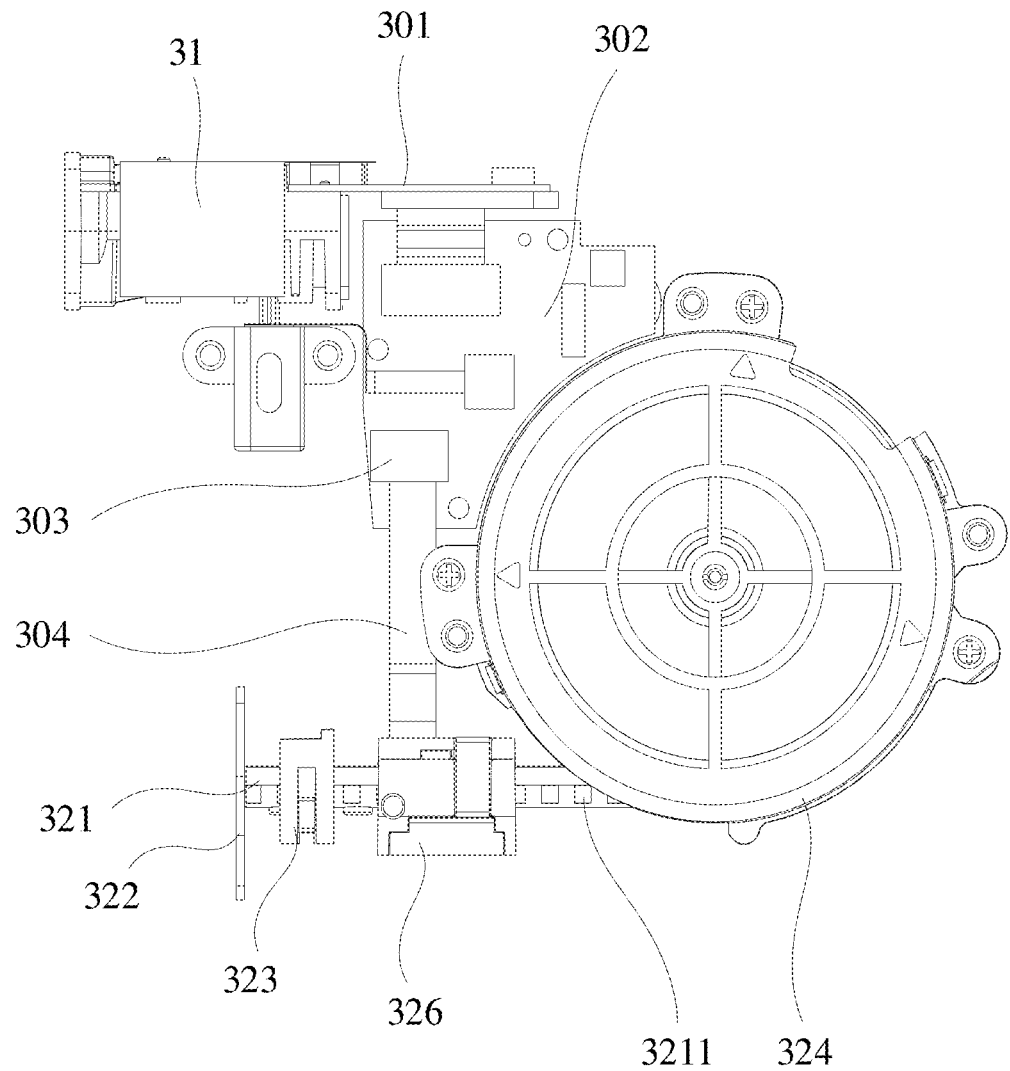
FIG. 26 is a structural schematic diagram of the marking assembly, the measuring structure and the PCB board of the distance measuring device of FIG. 1.
Figure 27:
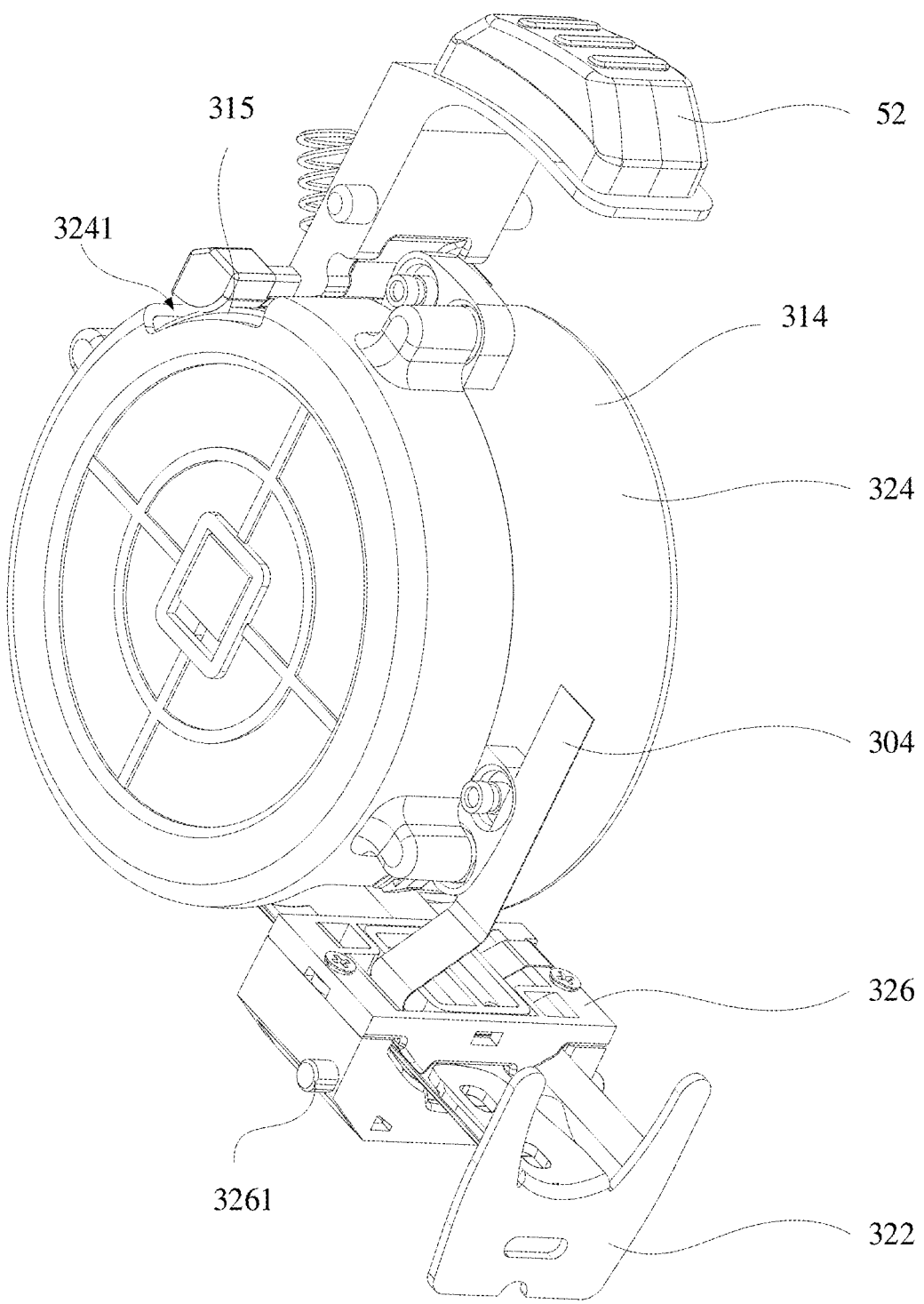
FIG. 27 is a structural schematic diagram of a braking assembly and the tape assembly of the distance measuring device of FIG. 1.
Figure 28:
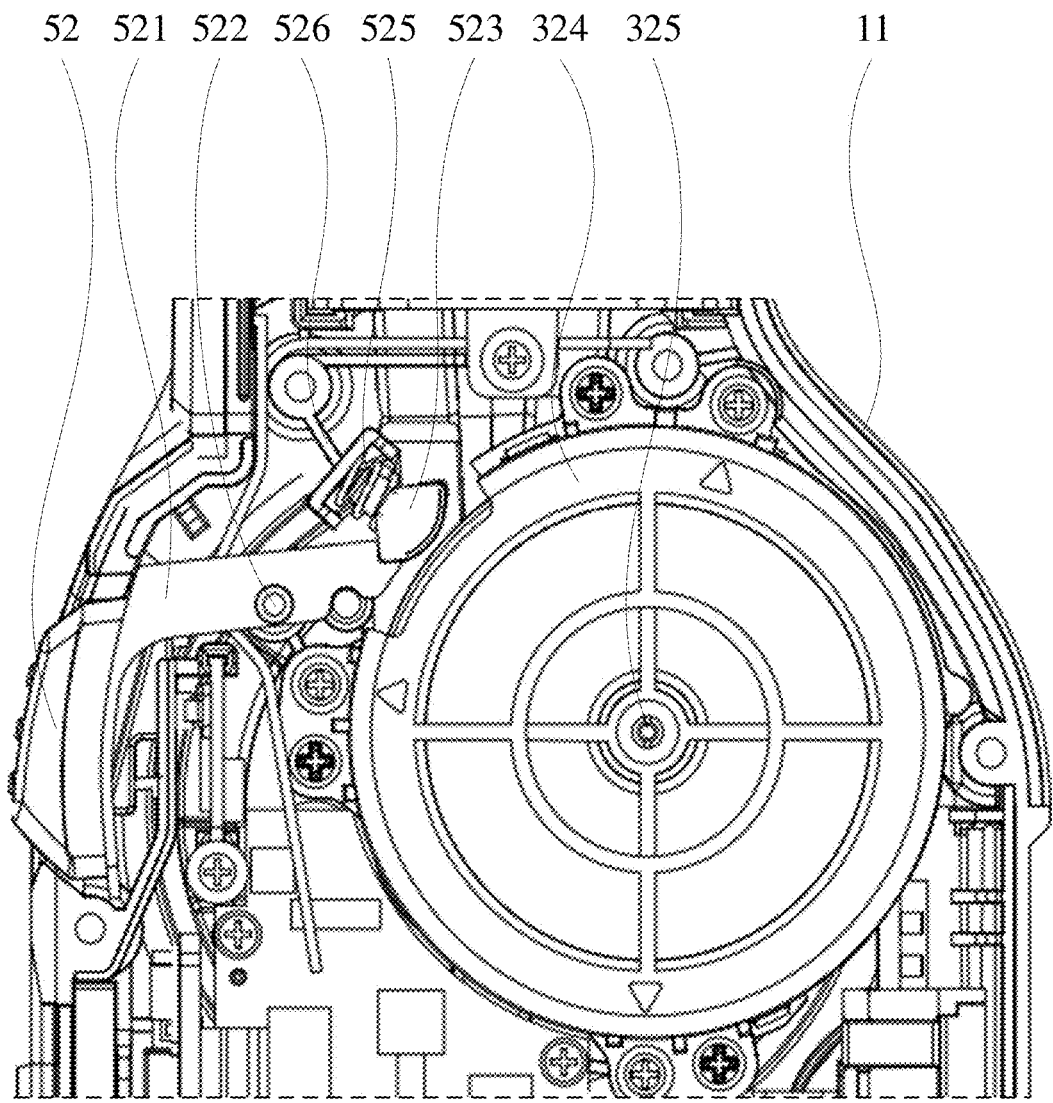
FIG. 28 is a structural schematic diagram of some components of the distance measuring device of FIG. 1.
Figure 29:
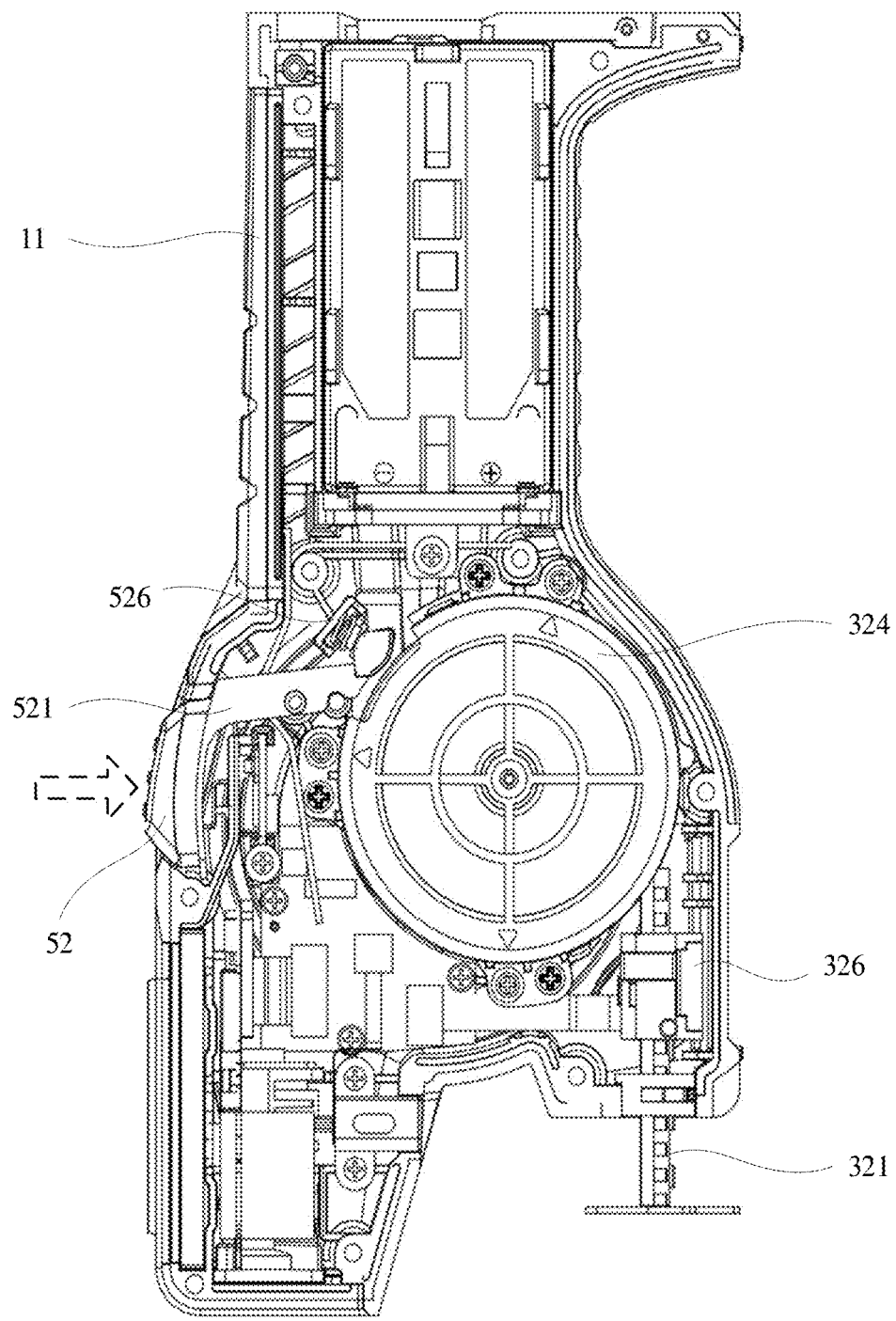
FIG. 29 is a structural schematic diagram of some components of the distance measuring device of FIG. 1.
Figure 30:
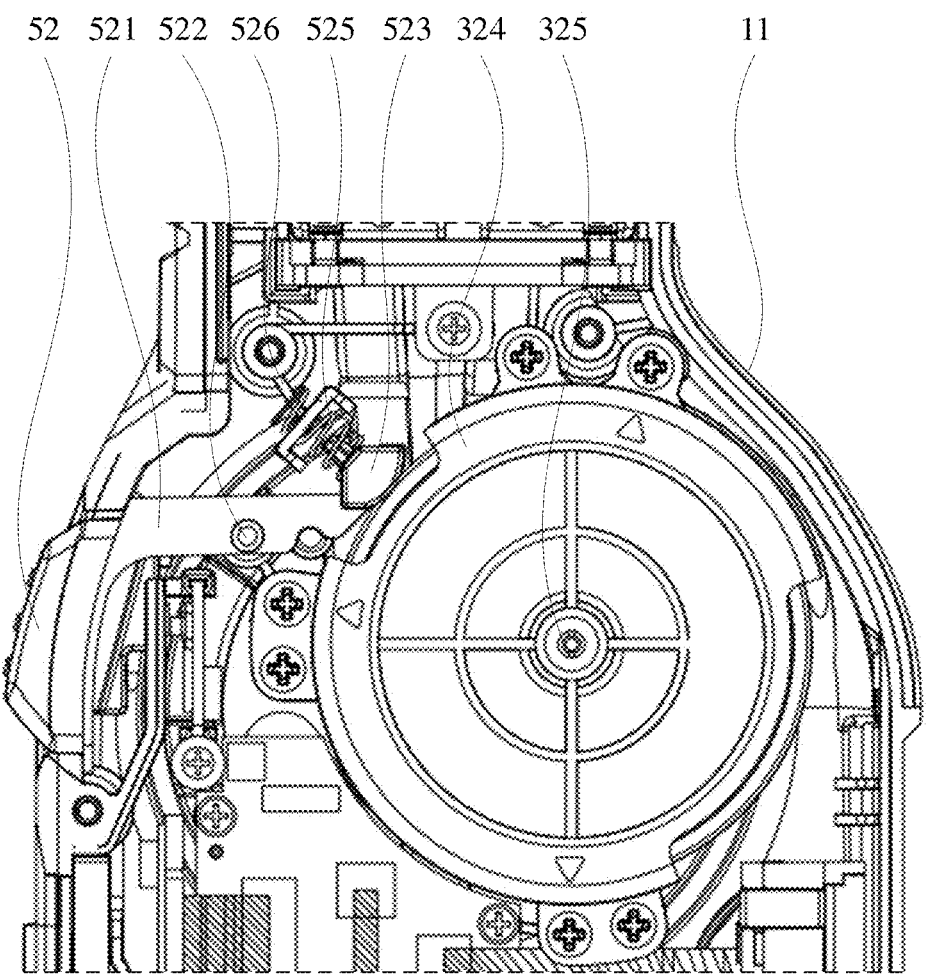
FIG. 30 is a structural schematic diagram of some components of the distance measuring device of FIG. 1.
Figure 31:
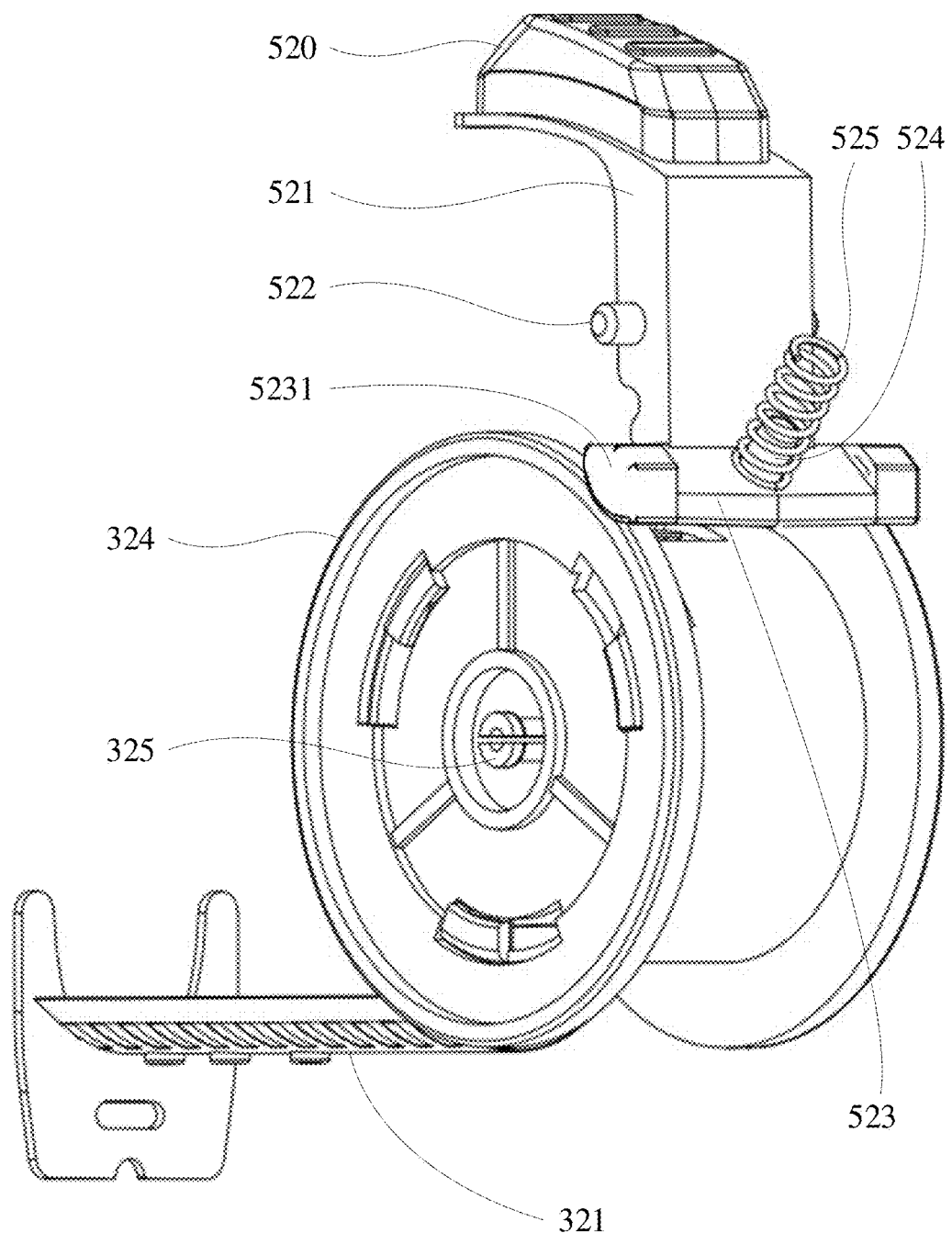
FIG. 31 is a structural schematic diagram of the braking assembly and the tape assembly of the distance measuring device of FIG. 1.
Figure 32:
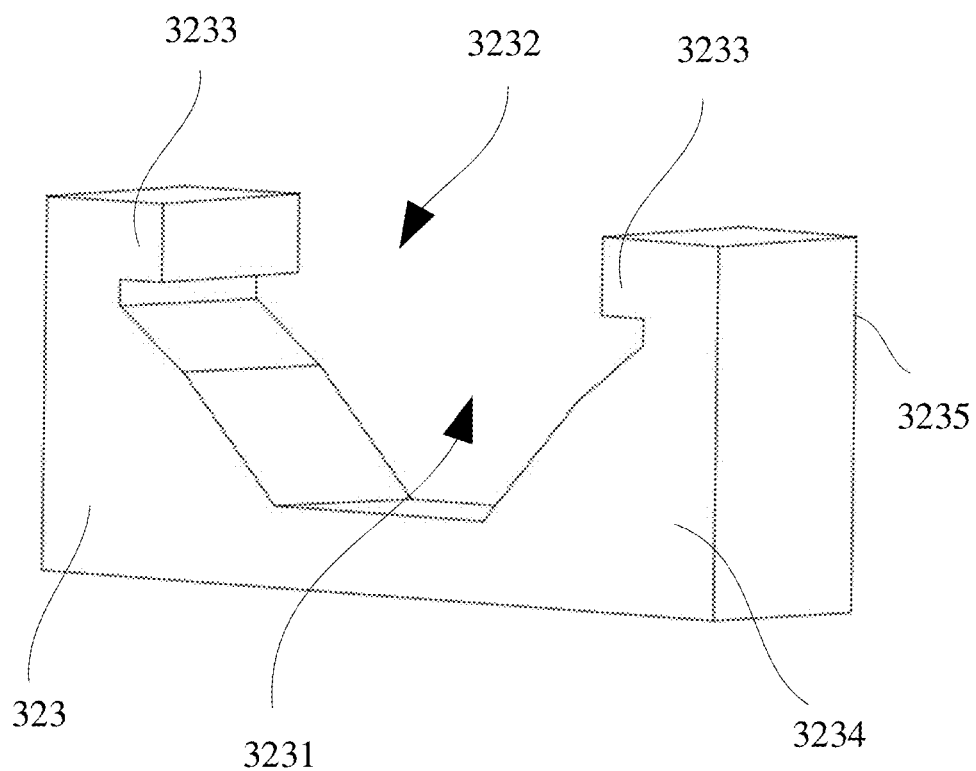
FIG. 32 is a structural schematic diagram of a sliding member of the distance measuring device of FIG. 1.
Figure 33:
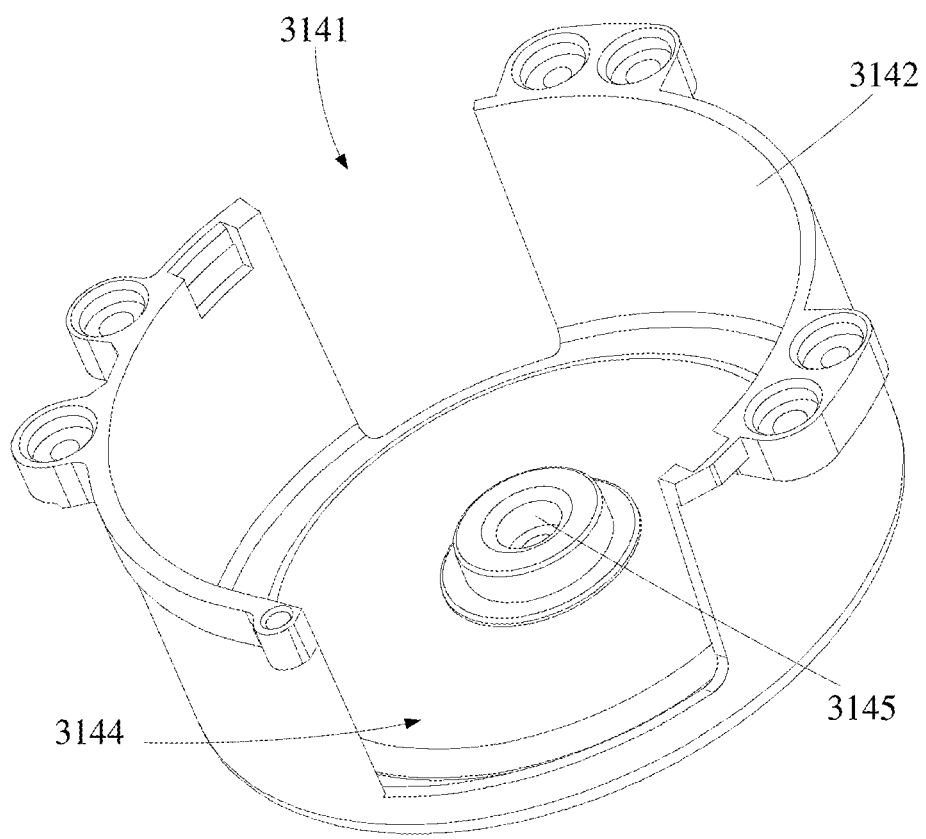
FIG. 33 is a structural schematic diagram of a first sub outer housing of the distance measuring device of FIG. 1.
Figure 34:
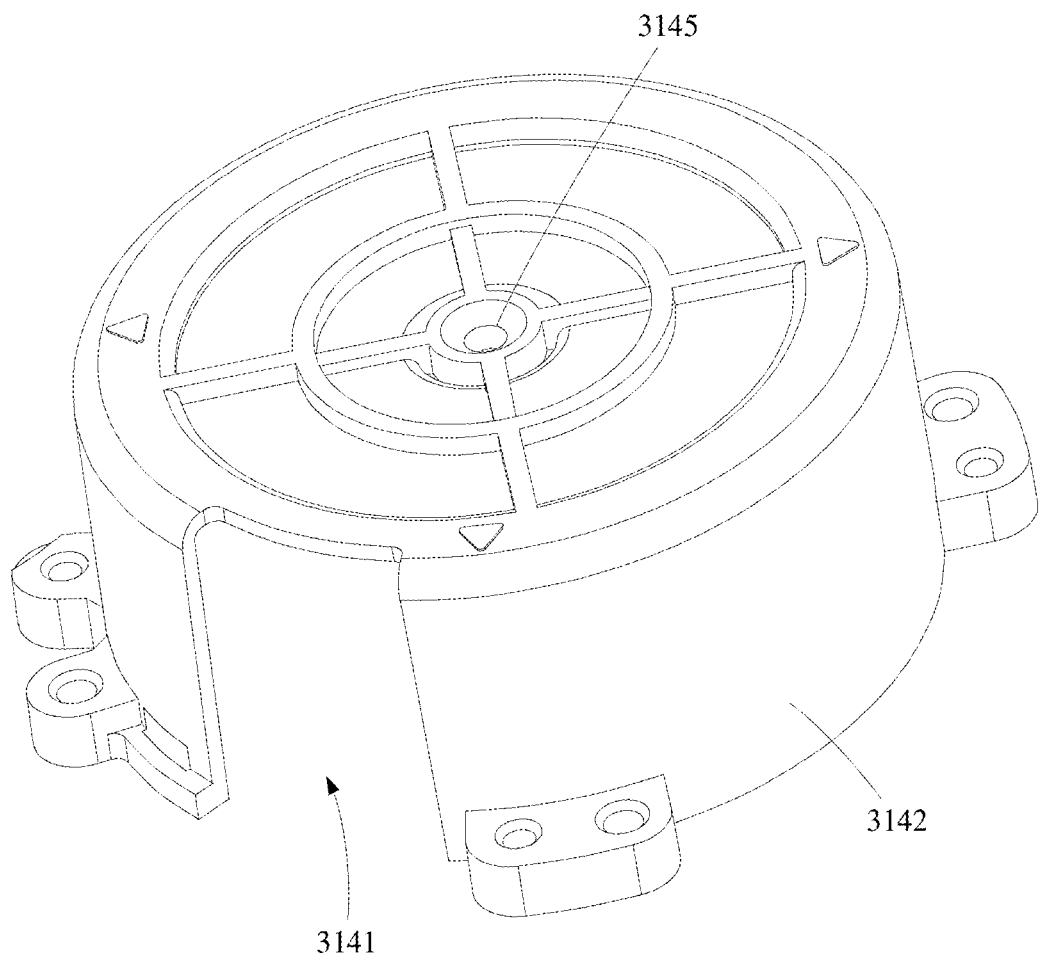
FIG. 34 is another structural schematic diagram of the first sub outer housing of FIG. 33.
Figure 35:
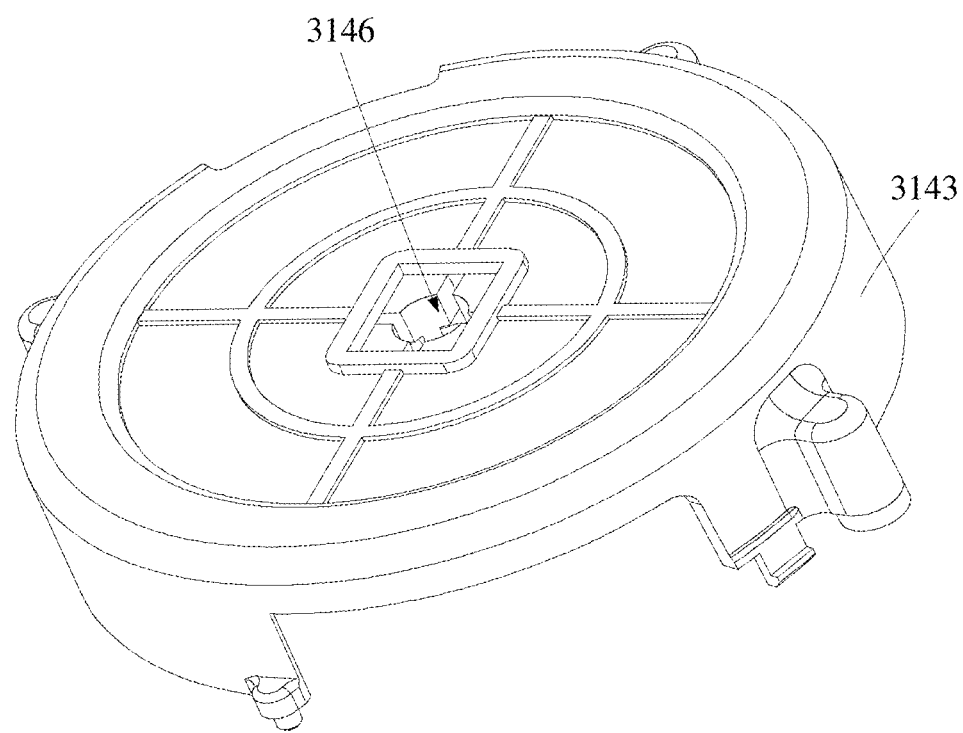
FIG. 35 is a structural schematic diagram of a second sub outer housing of the distance measuring device of FIG. 1.
Figure 36:
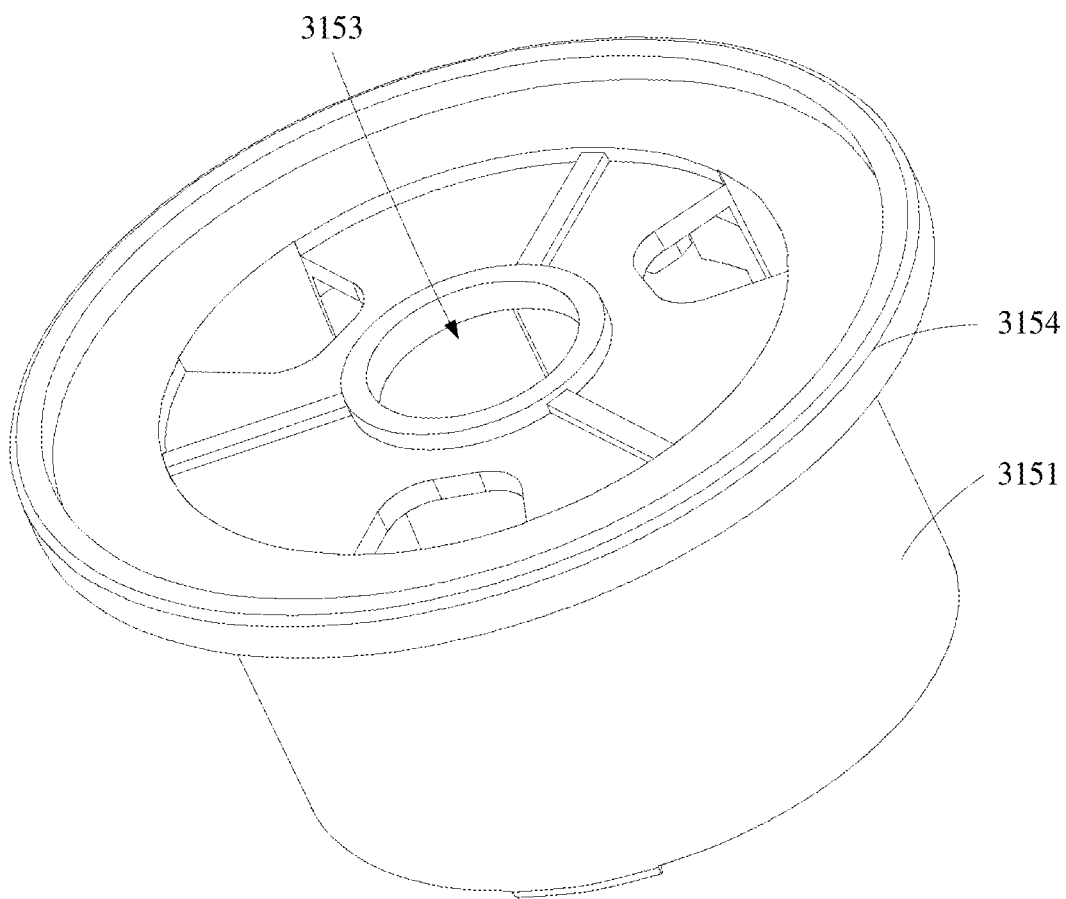
FIG. 36 is a structural schematic diagram of a first sub inner housing of the distance measuring device of FIG. 1.
Figure 37:
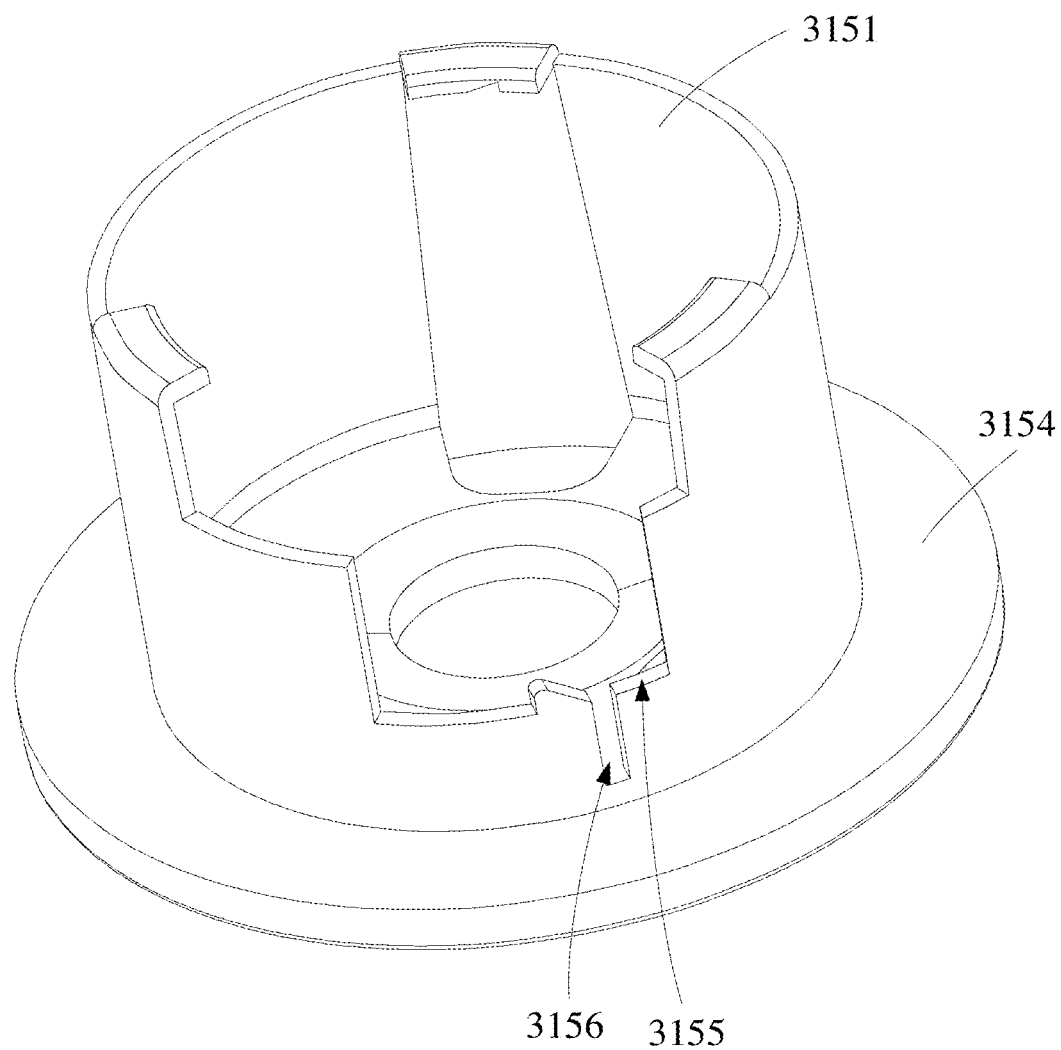
FIG. 37 is another structural schematic diagram of the first inner outer housing of FIG. 36.
Figure 38:
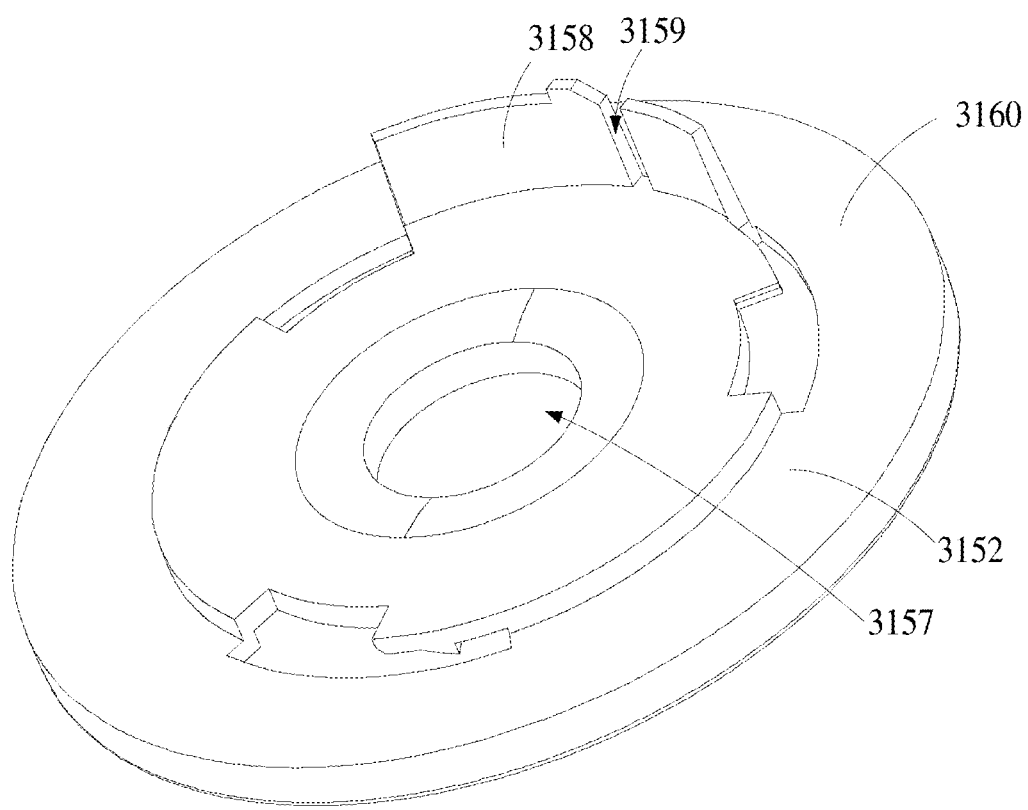
FIG. 38 is a structural schematic diagram of a second sub inner housing of the distance measuring device of FIG. 1.
Figure 39:
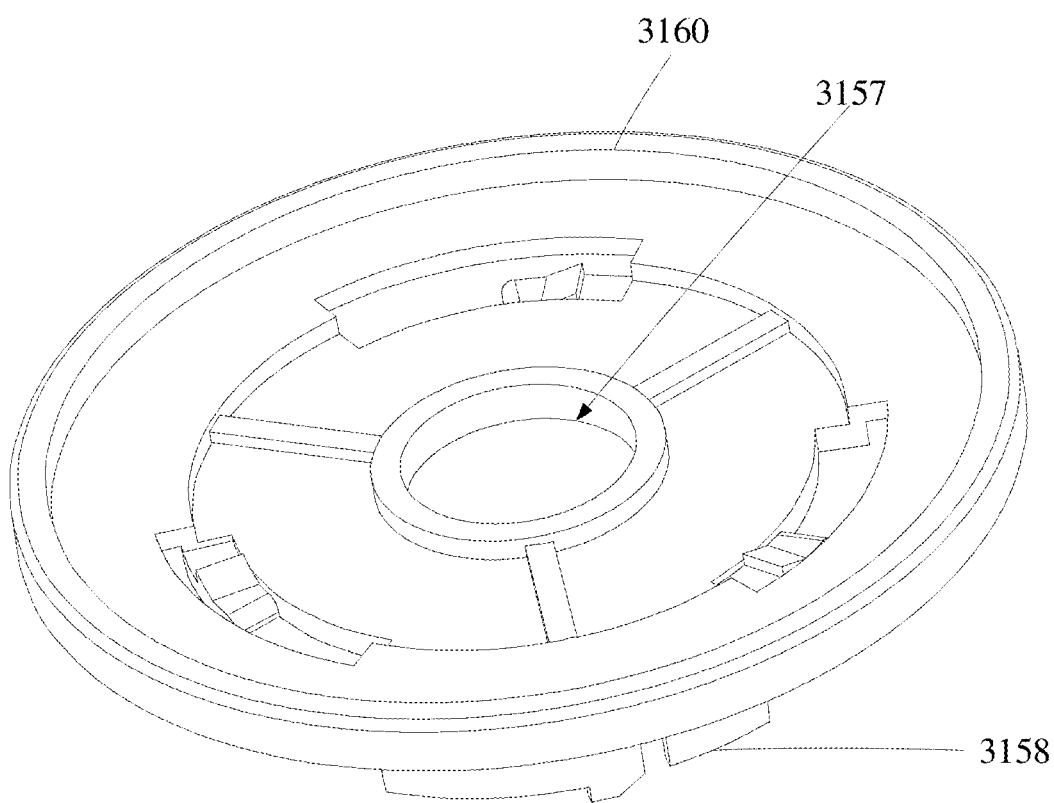
FIG. 39 is another structural schematic diagram of the second inner outer housing of FIG. 38.
Figure 40:
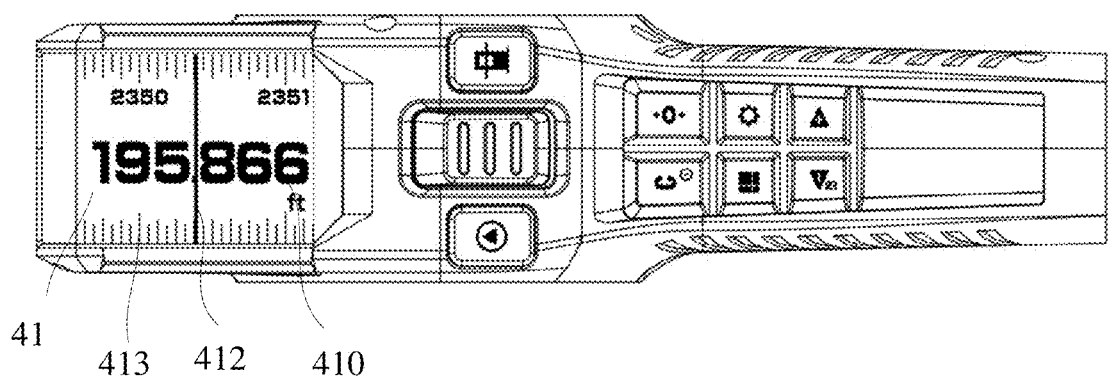
FIG. 40 is top view of the distance measuring device of FIG. 1.
Figure 41:
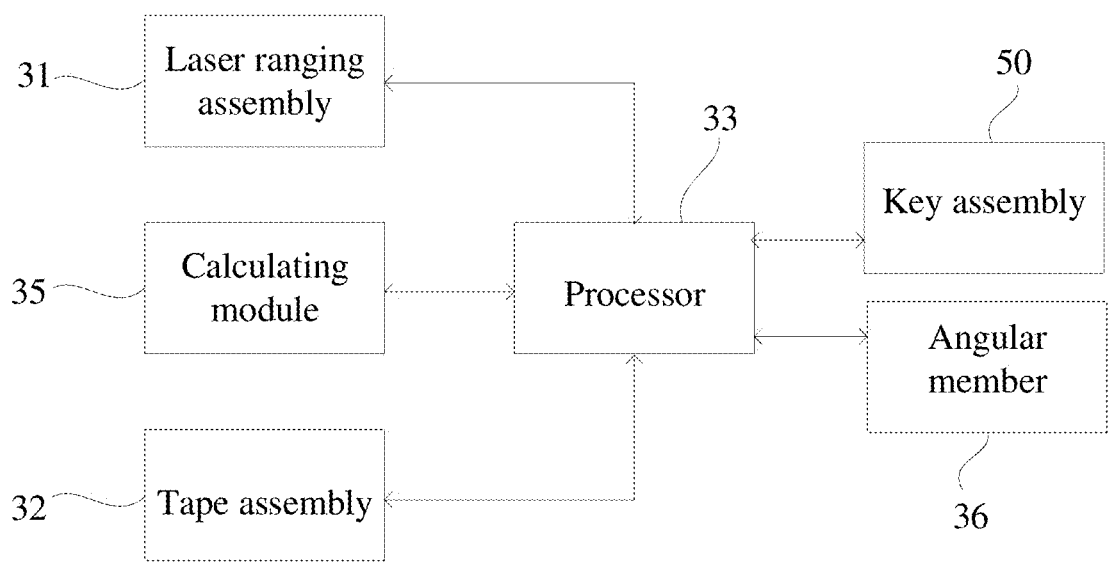
FIG. 41 is functional modules of the distance measuring device of FIG. 1.
Figure 42:
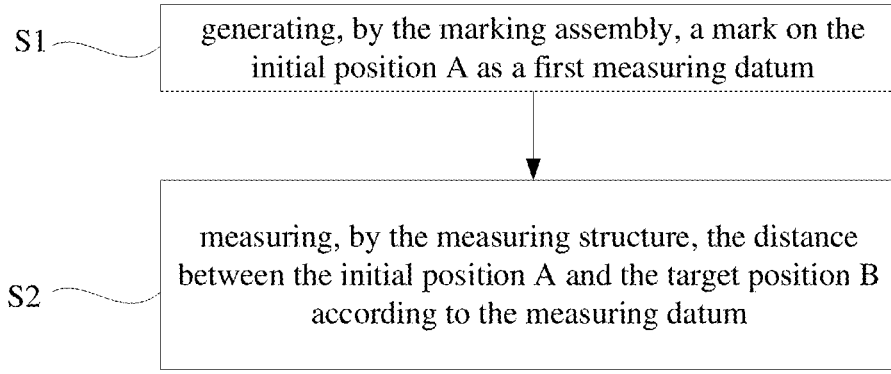
FIG. 42 is a flow chart of the distance measuring method according to an embodiment of the present disclosure.
Figure 43:
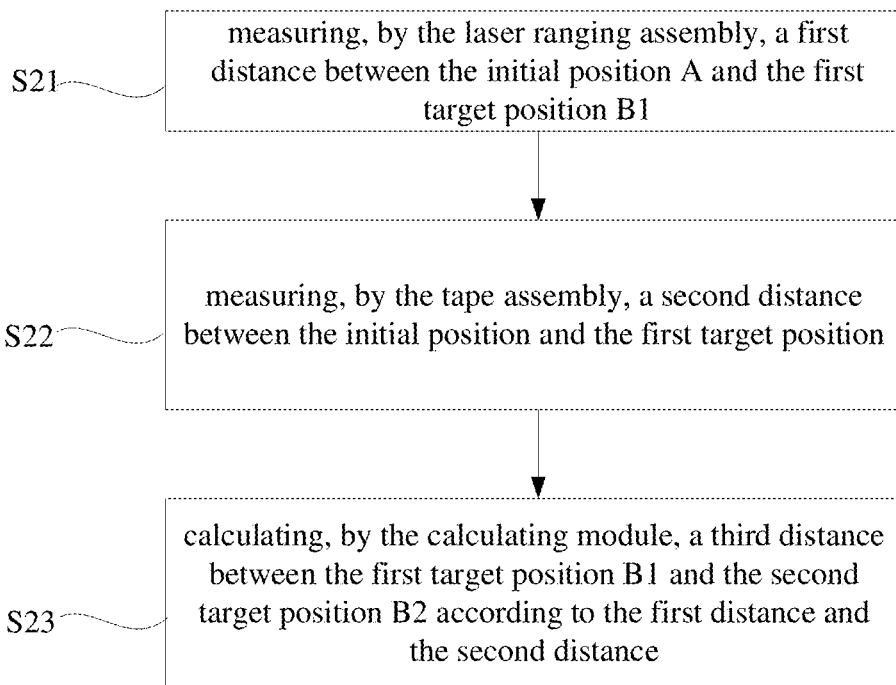
FIG. 43 is another flow chart of the distance measuring method according to an embodiment of the present disclosure.
Figure 44:
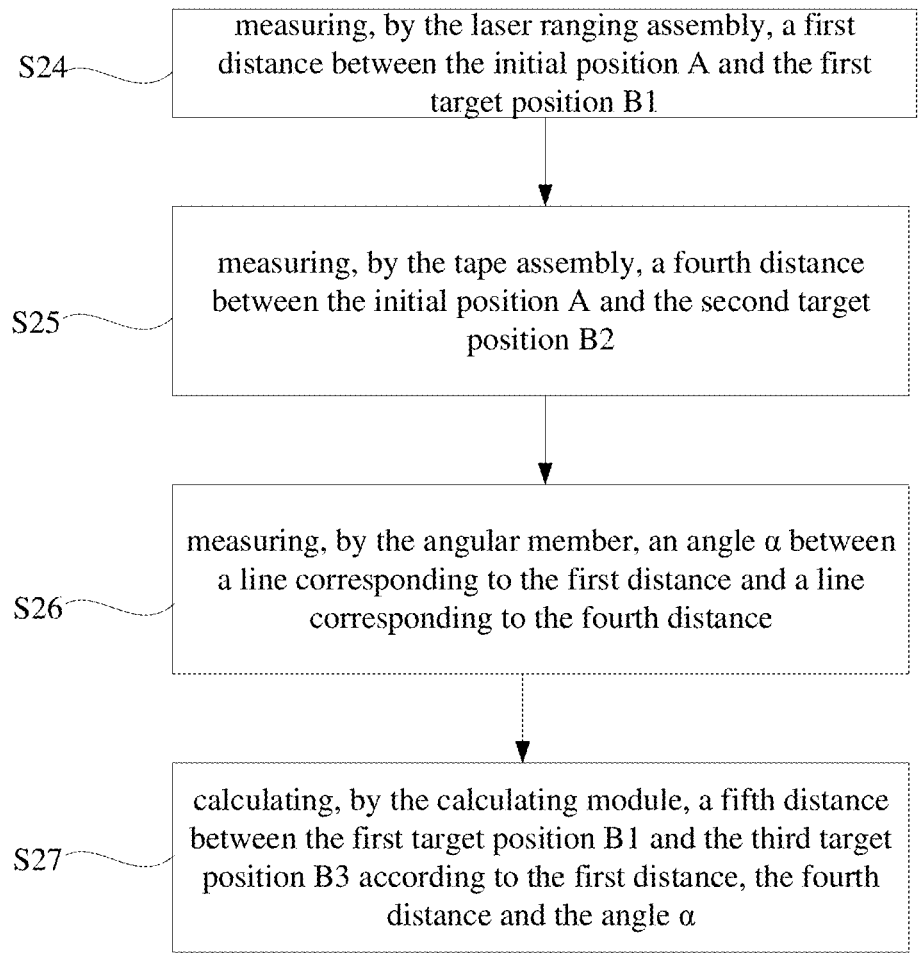
FIG. 44 is a further flow chart of the distance measuring method according to an embodiment of the present disclosure.
Figure 45:
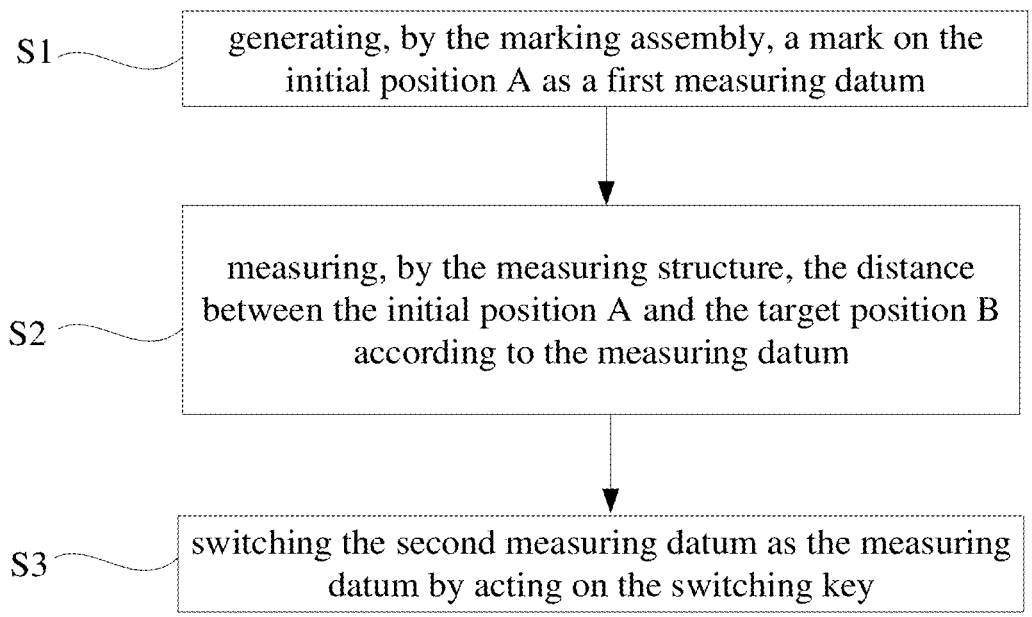
FIG. 45 is another flow chart of the distance measuring method according to an embodiment of the present disclosure.

The realization of the aim, functional characteristics, advantages of the present disclosure are further described specifically with reference to the accompanying drawings and embodiments.

DETAILED DESCRIPTION

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

Referring to FIGS. 1-47, the present disclosure provides a distance measuring device 100 configured to measure a distance between an initial position A and a target position B.

The distance measuring device 100 includes a marking assembly 20 configured to generate a mark on the initial position A as a first measuring datum 101 and a measuring structure 30 configured to measure the distance L1 between the initial position A and the target position B according to the first measuring datum.

Specifically, the marking assembly 20 includes a first laser emitting member 21, a light splitting member 22 located below the first laser emitting member 21 and configured to diffuse a laser beam emitted from the first laser emitting member 21, and a fixing member 23 configured to fix the first laser emitting member 21 and the light splitting member 22 in the housing 10. The fixing member 23 may be fixedly connected with the housing 10 by screw or adhesive, or the like. The first laser emitting member 21 and the light splitting member 22 are fixed in the housing 10 by the fixing member 23, so that the first laser emitting member 21 and the light splitting member 22 will not shift even if the distance measuring device 100 is used for a long time, a user does not need to adjust the position of the marking assembly 20. In this way, the accuracy of the marking assembly 20 is ensured. The first laser emitting member 21 defines a through hole 211 from which the laser beam emits, the fixing member 23 defines a through hole 231, a first mounting hole 232 and a second mounting hole 233, the first laser emitting member 21 and the light splitting member 22 are fixedly received in the through hole 231. The light splitting member 22 is perpendicular to the first laser emitting member 21, so that, the laser beam from the first laser emitting member 21 along the first direction is diffused to the laser beam 101 parallel to the third direction. The first direction is perpendicular to the length direction of the distance measuring device 100, the second direction is parallel with the length direction of the distance measuring device 100, and the third direction is parallel with the axis direction of the distance measuring device 100.

The fixing member 23 is fixed with the housing 10 by screws and the first mounting holes 232, and the first laser emitting member 21 and the light splitting member 22 are both mounted in the through hole 231, adhesives can be led into the fixing member 23 through the second mounting hole 233 to fix the first laser emitting member 21 and the light splitting member 22 in the fixing member 23. In one embodiment, the first laser emitting member 21 and the light splitting member 22 are both received in the through hole 231, and the light splitting member 22 is located below the first lase emitting member 22. In another embodiment, the first laser emitting member 21 and the light splitting member 22 are both received in the through hole 231, and the light splitting member 22 is received in the through hole 211, the light beam from the first laser emitting member 21 can be diffused to a light sheet by the light splitting member 22, and the diffused light sheet can pass through the through hole 231 and emit on the measuring structure 30 and its nearby region along the third direction.

It should be understood that, the diffused light sheet on the measuring structure 30 can be regarded as the first measuring datum 101.

The distance measuring device 100 further includes a processor 33. The measuring structure 30 includes a laser ranging assembly 31 and a tape assembly 32, the first measuring datum 101 is defined as a common measuring datum of the laser ranging assembly 31 and the tape assembly 32, and the first group of data measured by the laser ranging assembly 31 and the second group of data measured by the tape assembly 32 are both processed by the same processor 33. The two groups of data are consistent with each other.

The distance measuring device 100 further includes a display assembly 40, a key assembly 50 and a calculating module 35, the display assembly 40, the key assembly 50 and the calculating module 35 are all electrically connected with the processor 33. The data from the key assembly 50, the calculating module 35, the laser ranging assembly 31 and the tape assembly 32 are all processed by the processor 33, so that data accuracy and consistency can be improved. Processor 33 sends processed or stored data to the display assembly 40 for human reading.

The housing 10 includes a first mounting portion 103 and a second mounting portion 104, the first mounting portion 103 and the second mounting portion 104 are both arranged at the front portion 105 of the housing 10. The laser ranging assembly 31 is arranged in the first mounting portion 103, the tape assembly 32 is arranged in the second mounting portion 104, and the first mounting portion 103 is arranged above the second mounting portion 104 and extended out of the second mounting portion 104, to prevent the laser ranging assembly 31 from interfering with the tape assembly 32. Specifically, the marking assembly 20 is arranged between the laser ranging assembly 31 and the tape assembly 33, and the laser ranging assembly 31 is extended from the tape assembly 33 and the marking assembly 20.

The first mounting portion 103 defines a through hole 1031 and a through hole 1032, the laser beam from the laser ranging assembly 31 emits to the target position B by the through hole 1031, and laser reflected from the target position B is captured by the laser ranging assembly 31 after passing through the through hole 1032. The size of the through hole 1032 is greater than that of the through hole 1031, in order to ensure that the reflected laser can be received by the laser ranging assembly 31 as much as possible. The second mounting portion 104 defines a through hole 1041, a tape 321 of the tape assembly 32 can extended out of the housing through the through hole 1041.

The housing 10 further includes a top surface 1011, two side surfaces 1012, a rear portion 106 and a middle portion 107. The key assembly 50 is arranged on the top surface 1011 to facilitate manual operations. A battery 60, preferably a rechargeable battery, is detachably arranged in the rear portion 106, and user can take out the battery 60 for charging. The laser ranging assembly 31 is substantially arranged in the front portion 105, the tape assembly 32 is substantially arranged in the middle portion 107, and the battery 60 is detachably arranged in the rear portion 106.

The housing 10 further includes a back surface 1013 which can be defined as a second measuring datum 102. The key assembly includes a switching key 51 configured to switch between the first measuring datum 101 and the second measuring datum 102.

The housing further includes at least one support member, the at least one support member is configured to hold the laser beam emitted from the laser ranging assembly 31 such that an emitting direction of the laser beam is parallel with the length direction of the distance measuring device 100. The at least one support member includes a first support member 1014, a second support 1015 and a third support member 1016, the first support member 1014 is substantially arranged at the rear portion 106, the second support 1015 and the third support member 1016 are substantially arranged at the front portion 105.

The target position B includes a first target position B1 and a second target position B2, the tape assembly 32 is configured to measure a first distance L1 between the initial position A and the first target position B1, and the laser ranging assembly 31 is configured to measure a second distance L2 between the initial position A and the second target position B2. The calculating module 35 is adopted to calculate a third distance L3 between the first target position B1 and the second target position B2 according to the first distance L1, the second distance L2. The calculating module 35 is a built-in calculating program configured to calculate a distance L3, and is activated by key assembly 50.

The target position B includes a first target position B1 and a third target position B3, the tape assembly 32 is configured to measure a first distance L1 between the initial position A and the first target position B1, and the laser ranging assembly 31 is configured to measure a fourth distance L4 between the initial position A and the third target position B3. An angular member 36 is adopted to measure an angle α between a line corresponding to the first distance L1 and a line corresponding to the fourth distance L4, and the calculating module 35 is configured to calculate a fifth distance L5 between the first target position B1 and the third target position B3 according to the first distance L1, the fourth distance L4 and the angle α. In one embodiment, the angular member 36 is arranged on the processor 33 and electrically connected with the processor 33. In another embodiment, the angular member 36 is built in the processor 33.

The display assembly 40 is electrically connected with the processor 33. The display assembly 40 includes a display 41, a support 42, a protective film 43 covered on the display 41, the support 42 defines a cavity 421 for receiving the display 41. The support 42 further include a blocking portion 422 for preventing the display 41 from slipping out of the cavity 421. The display 41 includes a connecting portion 411 electrically connected with the main PCB board 301. The display 41 is configured to display a distance value 410, a visual measuring datum 412 and a visual tape 413, the visual measuring datum 412 is substantially arranged at a middle portion of the display 41 and coincided with the first measuring datum 101. The visual tape 413 is substantially coincided with the tape 321 of the tape assembly 32.

The laser ranging assembly 31 includes a second laser emitting member 311 electrically controlled by the processor 33 and configured to emit a laser beam to the target position B, a photoelectric conversion member 312 electrically controlled by the processor 33 and configured to capture an optical signal of a reflected laser light, and a protective housing 313, either one part or two part as a whole, configured to receive the second laser emitting member 311 and the photoelectric conversion member 312. The photoelectric conversion member 312 converts the optical signal into an electronical signal. The processor 33 is configured to determine the distance between the initial position A and the target position B based on the first measuring datum according to the electrical signal. The protective housing 313 defines a first opening portion 3131 and a second opening portion 3132. The second laser emitting member 311 and the photoelectric conversion member 312 are exposed from the first opening portion 3131 and the second opening portion 3132. Sizes of the first opening portion 3131 and the second opening portion 3132 are substantially increased along a direction from the rear potion 106 to the front portion 103, and the size of the second opening portion 3132 is larger than that of the first opening portion 3131, in order to ensure that the reflected laser light can be received by the photoelectric conversion member 312 as much as possible. The angular member 36 is also exposed from the second opening portion 3132.

Referring to FIGS. 14-24, the housing 10 includes a first sub housing 11, a second sub housing 12, a third sub housing 13, a fourth sub housing 14, and two decoration members 15, the first sub housing 11 is detachably connected with the second sub housing 13, and the marking assembly 20 and the measuring structure 30 are received in a space enclosed by the first sub housing 11 and the second sub housing 12. The third sub housing 13 is detachably connected with the first sub housing 11 and the fourth sub housing 14 is detachably connected with the second sub housing 12, one of the two decoration members 15 is detachably arranged on the first sub housing 11 and/or the third sub housing 13, and another one of the two decoration members 15 is detachably arranged on the second sub housing 12 and/or the fourth sub housing 14. The third sub housing 13, the fourth sub housing 14 and two decoration members 15 are designed with different colors or shapes to improve the appearance of the device.

The first sub housing 11 includes at least one first connecting portion. The second sub housing 12 includes at least one second connecting portion. The at least one first connecting portion is connected with the at least one second connecting portion to connect the first sub housing 11 with the second sub housing 12. The third sub housing 13 is detachably received in a mounting part 114 of the first sub housing 11, the fourth sub housing 14 is detachably received in the mounting 124 of the second sub housing 12, the third sub housing 13 and the fourth sub housing 14 can be replaced. A width of the at least one first connecting portion is different from that of the at least one second the other connecting portion for the ease of future maintenance & service. In one embodiment, the width of the at least one first connecting portion is larger than that of the at least one second the other connecting portion. The at least one first connecting portion includes a first sub connecting portion 111 and a second sub connecting portion 112, the at least one second connecting portion includes a third sub connecting portion 121 and a fourth sub connecting portion 122, the first sub connecting portion 111 is detachably connected with the third sub connecting portion 121, and the second sub connecting portion 112 is detachably connected with the fourth sub connecting portion 122, and the widths of the first sub connecting portion 111 and the second sub connecting portion 112 are greater than those of the third sub connecting portion 121 and the fourth sub connecting portion 122, respectively. The first sub housing 11 further includes a third connecting portion 113. The second sub housing 12 further includes a fourth connecting portion 123 detachably connected with the third connecting portion 113. A width of the third connecting portion 113 can be substantially equal to that of the fourth connecting portion 123, or unequal. The width of the first sub connecting portion 111 is substantially greater than that of the third connecting portion 113, a notch is defined between the first sub connecting portion 111 and the third connecting portion 113, and the fourth connecting portion 123 is inserted into the notch and connected with the third connecting portion 113. The first sub connecting portion 111 defines a first mounting part 1111 configured to mount the display, and the third sub connecting portion 112 defines a second mounting part 1121 configured to mount at least a part of the key assembly. The battery is also detachably mounted in rear portion of the first sub housing 11.

The first sub connecting portion 111 further defines a through hole 1112 corresponded with the through hole 1031 and the through hole 1032. The laser ranging assembly 31 can emit laser beam and receive reflected laser light by the through hole 1112. The first sub connecting portion 111 further defines a through hole 1113 and a through hole 1114, and the third sub connecting portion 121 defines a notch 1211, a through hole 1213, and a through hole 1214, the marking assembly is exposed from the through hole 1113 and the through hole 1213, and the tape assembly 32 is exposed from the through hole 1114 and the through hole 1214.

The third sub housing 13 is arranged on the first sub housing 11, and the third sub housing 13 includes a fifth sub connecting portion 131 connected with the first sub connecting portion 111, which defines a through hole 1311 corresponded with the through hole 1112, the through hole 1031 and the through hole 1032. The laser ranging assembly 31 can emit light and receive reflected light by the through hole 1311. The third sub housing 13 further includes two legs 132 arranged on the first sub housing 11 and a sixth sub connecting portion 133 corresponded with the sub connecting portion 113. The fifth sub connecting portion 131 further defines a notch 1310 for mounting the display assembly.

The fourth sub housing 14 is arranged on the second sub housing 12, and the fourth sub housing 14 includes a seventh sub connecting portion 141 connected with the third sub connecting portion 121, which defines a through hole 1411 corresponded with the through hole 1031 and the through hole 1032. The laser ranging assembly 31 can emit light and receive reflected light by the through hole 1411. The fourth sub housing 14 further includes two legs 142 arranged on the second sub housing 12 and an eighth sub connecting portion 143 corresponded with the fourth connecting portion 123.

The fifth sub connecting portion 131 further defines a through hole 1312, and the seventh sub connecting portion 141 further defines a through hole 1412, the marking assembly 20 is exposed from the through hole 1312 and the through hole 1412. The fifth sub connecting portion 131 further defines a through hole 1313, and the seventh sub connecting portion 141 further defines a through hole 1413, the tape assembly is exposed from the through hole 1313 and the through hole 1413.

The sixth sub connecting portion 133 defines a receiving portion 1331 and an opening 1332. The eighth sub connecting portion 143 defines a receiving portion 1431 and an opening 1432. The key assembly 50 further includes a brake member 52 adjacent to the switching key 51 and configured to enable or stop the movement of the tape 321, and a start key 53 configured to enable the laser ranging assembly 31 start to measure the distance toward a target.

The second sub connecting portion 113 defines a receiving portion 1131 and an opening 1132, the sixth sub connecting portion 133 defines a receiving portion 1331 and an opening 1332, and the switching key 51 is received in the receiving portion 1131 and the receiving portion 1331. The fourth sub connecting portion 123 defines a receiving portion 1231 and an opening 1232, the eighth sub connecting portion 143 defines a receiving portion 1431 and an opening 1432, and the start key 53 is received in the receiving portion 1231 and the receiving portion 1431. The brake member 52 is received in the opening 1132, the opening 1232, the opening 1332, the opening 1432.

The tape assembly 32 includes a tape 321, a clamping end 322 configured to clamp the object, a moving member 323 slidably arranged on the tape 321, a mounting housing 324 received in the housing 10, a rotating member 325 rotatably arranged in the housing 10, and a sensor 326 arranged between the mounting housing 324 and the through hole 1041. The mounting member 324 includes an outer housing 314 which is fixedly mounted in the housing 10 and an inner housing 315 rotatably received in the outer housing 314. In detail, the outer housing 314 is fixedly connected with the first sub housing 11. The tape 321 is retractably wound around the rotating member 325 by a spiral spring (not shown) and received in the inner housing 315. The tape 321 is provided with a plurality of step coding and/or scales 3211, the sensor 326 can detect the distance according to the step code and/or scales and the measuring datum. The sensor 326 can be a photoelectric sensor.

The first sub housing 11 is provided with at least two first limiting portions 1117, the second sub housing 12 is provided with at least two second limiting portions 1217 corresponded with the at least two first limiting portions 1117, the sensor 326 is received in a space enclosed by the two first limiting portions 1117 and the two second limiting portions 1217.

The sensor 326 is provided with two sliding rods 3261. The first sub housing 11 is provided with a sliding part 1116, the second sub housing 12 is provided with a sliding part 1216, the two sliding rods 3261 are respectively slidably received in the sliding part 1116 and the sliding part 1216. Each of the sliding part 1116 and the sliding part 1216 defines a groove in which the sliding rod slides.

The moving member 323 defines a slot 3231 for receiving the tape 321, an opening 3232 communicated with the slot 3231, and two protrusions 3233 protruded from two sides of the opening 3232. The slot 3231 is substantially V-shaped, and the maximum width of the V-shaped slot 3231 is equal to or slightly larger than the width of the tape 321. The two protrusions 3233 respectively abut against a corresponding edge of the tape 321.

Figure 46:
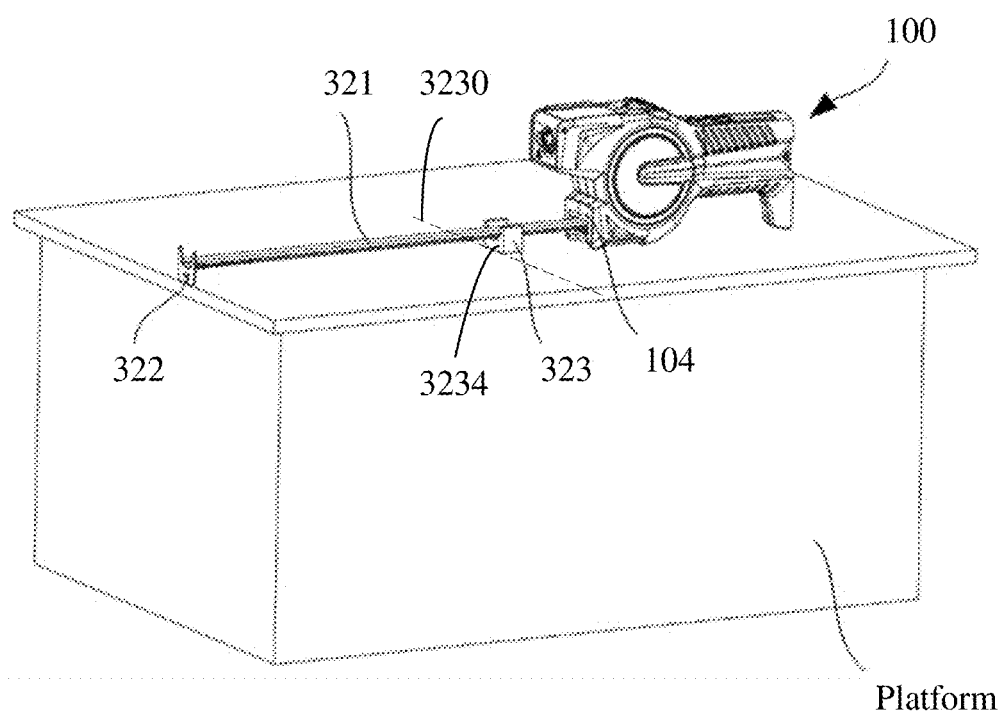
FIG. 46 is another measuring scenario of the distance measuring device of FIG. 1.
Figure 47:
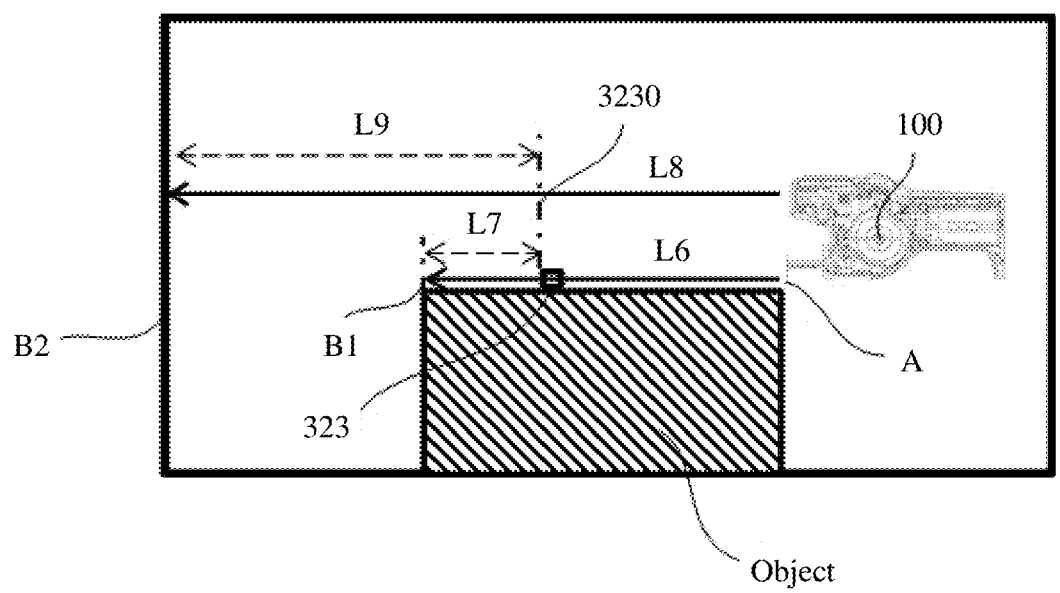
FIG. 47 is a further measuring scenario of the distance measuring device of FIG. 1.

As shown in FIG. 46-47, when the distance measuring device 100 is placed on the object, such as a platform, and the clamping end 322 is extended out of the distance measuring device 100 and located on the object, a gap is formed between the tape 321 and the object, as such the moving member 323 can slide on the tape 321 smoothly. A surface of the moving member 323 can be regarded as a third measuring datum 3230. User can mark out the third measuring datum 3230 on the tape 321 along the front surface 3234 for the ease of reading. As the moving member 323 is movable, the third measuring datum 3230 is an adjustable measuring datum, and the third measuring datum 3230 can be adjusted according to an actual need. Preferably, the front surface 3234 of the moving member 323 is regarded as the third measuring datum 3230, at this time, the third measuring datum 3230 is an adjustable front measuring datum. It should be understood that, the back surface 3235 of the moving member 323 can also be regarded as a measuring datum. User can draw the third measuring datum 3230 on the object with a pen along the front surface 3234 or the back surface 3235 of the moving member 323, and the front surface 3234 or the back surface 3235 of the moving member 323 can assist in the marking of the third measuring datum 3230.

The tape assembly 32 can measure a sixth distance L6 between the initial position A and the front surface 3234 and a seventh distance L7 between the first target position B1. The laser ranging assembly 31 can measure an eighth distance L8 between the initial position A and the second target position B2. A ninth distance L9 can be calculated by the calculating module 35 according to the eighth distance L8 and the sixth distance L6.

The tape assembly 32 is detachably received in the housing 10 and separated from the laser ranging assembly 31 and the marking assembly 20, the sensor 326 is electrically connected with a secondary PCB 302 by an electric strip 304, the electric strip 304 is electrically connected with the secondary PCB 302 by connection 303. User can detach the electric strip 304 from the connection 303, and take the tape assembly 32 out of the housing 10 without affecting the mechanical position and rigidness of the laser ranging assembly 31, the secondary PCB 302 and the marking assembly 20. In this way, the tape assembly 32 can be taken out of the first sub housing 11 and replaced with a new one conveniently.

The laser ranging assembly 31, the mounting housing 324, the rotating member 325, the display assembly 40, the marking assembly 20, the battery 60 are all arranged at the first sub housing 11. When user wants to disassemble the housing 10, user can detach the second sub housing 12 from the first sub housing 11 without affecting the mechanical position and rigidness of the above listed components.

The brake member 52 is elastically resisted against an inner housing 315 of the mounting housing 324 when no external force is applied on the brake member 52; the brake member 52 is suffered to the external force, the brake member 52 is forced to separate from the inner housing 315, and the tape 321 retracts automatically by the force of spiral spring (not shown). The brake member 52 includes an acting portion 520 exposed from the housing 10, a connecting portion 521, two connecting rods 522 protruded from two sides of the connecting portion 521 respectively and rotatably connected with a receiving part 1133 of the first sub housing 11 and a receiving part 1233 of the second sub housing 12, a contacting portion 523 resisted against the inner housing 315 other than the tape 321, a mounting portion 524 protruded from a middle portion of the contacting portion 523, a spring 525 sleeved around the mounting portion 524, and a limiting portion 526 obliquely extended from the first sub housing 11, the limiting portion 526 defines a limiting groove, the spring 525 is received in the limiting groove. Two ends of the contacting portion 523 are arranged with contacting heads 5231 which are contacted with the inner housing 315. The connecting portion 521 is connected between the acting portion 521 and the contacting portion 523. The contacting portion 523 is obliquely connected with the connecting portion 521 and contacted with the inner housing 315 obliquely. When the acting portion 520 is suffered to the external force, the brake member 52 rotates, and the contacting portion 523 moves away from the inner housing 315, the tape 321 retracts automatically. In the natural state, the contacting portion 523 resists against the inner housing to stop the movement of the tape 321, user can drag the tape 321 to pull the tape 321 out of the housing 10. The brake member 52 only contacts with the outer housing 314 to avoid a damage to the tape 321.

The outer housing 314 defines a notch 3141, the contacting portion 523 extends into the notch 3141 and resists against the inner housing 315. The outer housing 314 includes a first sub outer housing 3142 and a second sub outer housing 3143 connected with each other, the inner housing 315 is received in a space enclosed by the first sub outer housing 3142 and the second sub outer housing 3143. The first sub outer housing 3142 and the second sub outer housing 3143 cooperatively define the notch 3141, and further define a notch 3144 from which the tape 321 is exposed. The first sub outer housing 3142 defines a through hole 3145, and the second sub outer housing 3143 also defines a through hole 3146, the rotating member is rotatably received in the through hole 3145 and the through hole 3146.

The inner housing 315 includes a first sub inner housing 3151 and a second sub inner housing 3152 connected with each other, the first sub inner housing 3151 defines a through hole 3153, the second sub inner housing 3152 defines a through hole 3157, the rotating member is received in the through hole 3153 and the through hole 3157. The second sub inner housing 3152 further defines a notch 3155 and a notch 3156, the second sub inner housing 3152 is protruded with a protruding plate 3158 received in the notch 3155, the protruding plate 3158 defines a notch 3159, the tape 321 passes through the notch 3156 and the notch 3159. The contacting portion 523 resists against an edge 3154 of the first sub inner housing 3151 and an edge 3160 of the second sub inner housing 3152.

Referring to FIGS. 42-45, the present disclosure further provides a distance measuring method by the distance measuring device 100. The distance measuring method includes:

S1: generating, by the marking assembly 20, a mark on the initial position A as a first measuring datum 101; and S2: measuring, by the measuring structure 30, the distance between the initial position A and the target position B according to the measuring datum 101.

The target position includes a first target position B1 and a second target position B2, the distance measuring method further includes:

S21: measuring, by the laser ranging assembly 31, a first distance between the initial position A and the first target position B1;

S22: measuring, by the tape assembly 32, a second distance between the initial position and the first target position; and S23: calculating, by the calculating module 35, a third distance between the first target position B1 and the second target position B2 according to the first distance and the second distance.

The distance measuring method further includes:

S24: measuring, by the laser ranging assembly 31, a first distance between the initial position A and the first target position B1;

S25: measuring, by the tape assembly 32, a fourth distance between the initial position A and the second target position B2;

S26: measuring, by the angular member 36, an angle α between a line corresponding to the first distance and a line corresponding to the fourth distance; and S27: calculating, by the calculating module 35, a fifth distance between the first target position B1 and the third target position B3 according to the first distance, the fourth distance and the angle α.

The distance measuring method further includes:

S3: switching the second measuring datum as the measuring datum by acting on the switching key.

It should be understood that, user can also act on the switching key again to switch the first measuring datum as the measuring datum.

The above description is merely some embodiments. It should be noted that for one with ordinary skills in the art, improvements can be made without departing from the concept of the present disclosure, but these improvements shall fall into the protection scope of the present disclosure.

What is claimed is:

1. A distance measuring device, configured to measure a distance between an initial position and a target position, wherein the distance measuring device comprises:
a marking assembly, configured to generate a mark on the initial position as a first measuring datum; and
a measuring structure, configured to measure the distance between the initial position and the target position according to the first measuring datum;
wherein the distance measuring device further comprises a housing; and
the marking assembly comprises:
a first laser emitting member;
a light splitting member, located below the first laser emitting member and configured to diffuse a laser beam emitted from the first laser emitting member to a light sheet overlapped with the first measuring datum; and
a fixing member, configured to fix the first laser emitting member and the light splitting member in the housing.

2. The distance measuring device of claim 1, further comprising:
the measuring structure comprises a laser ranging assembly and a tape assembly, the first measuring datum is defined as a common measuring datum of the laser ranging assembly and the tape assembly; and
the distance measuring device further comprises a processor, the laser ranging assembly and the tape assembly are both electrically connected with the processor.

3. The distance measuring device of claim 1, wherein the measuring structure comprises a laser ranging assembly and a tape assembly, the tape assembly is configured to be detachable from the laser ranging assembly and the marking assembly for replacement.

4. The distance measuring device of claim 1, further comprising:
a processor, a display assembly, a key assembly and a calculating module, the display assembly, the key assembly and the calculating module are all electrically connected with the processor.

5. The distance measuring device of claim 1,
wherein the housing comprises a top surface; and
the distance measuring device further comprises a key assembly, arranged on the top surface.

6. The distance measuring device of claim 1, wherein
the housing further comprises a back surface defined as a second measuring datum; and
the distance measuring device further comprises a key assembly, the key assembly comprises a switching key configured to switch between the first measuring datum and the second measuring datum.

7. The distance measuring device of claim 1,
wherein the housing comprises a rear portion; and
the distance measuring device further comprises a battery, detachably received in the rear portion.

8. The distance measuring device of claim 1, wherein the housing comprises:
a first sub housing, comprising at least one first connecting portion; and
a second sub housing, comprising at least one second connecting portion, the at least one first connecting portion is connected with the at least one second connecting portion to connect the first sub housing with the second sub housing, and a width of the at least one first connecting portion is greater than that of the at least one second connecting portion.

9. The distance measuring device of claim 1, wherein the measuring structure comprises a laser ranging assembly and a tape assembly; and
the housing of the distance measuring device comprises a front portion and a middle portion, the laser ranging assembly is substantially arranged in the front portion and the tape assembly is substantially arranged in the middle portion.

10. The distance measuring device of claim 1, wherein
the target position comprises a first target position and a second target position, the measuring structure is configured to measure a first distance between the initial position and the first target position, and a second distance between the initial position and the second target position; and the distance measuring device further comprises:
- a processor;
- an angular member, electrically connected with the processor and configured to detect an angle between a line connecting the first target position and the initial position and another line connecting the second target position and the initial position; and
- a calculating module, electrically connected with the processor and configured to calculate a distance between the first target position and the second target position according to the first distance, the second distance and the angle.

11. The distance measuring device of claim 1, wherein
the measuring structure comprises a laser ranging assembly and a tape assembly; and
the distance measuring device further comprises a housing comprising at least one support member, the at least one support member is configured to hold a laser beam emitted from the laser ranging assembly such that an emitting direction of the laser beam is parallel with a length direction of the distance measuring device.

12. The distance measuring device of claim 1, further comprising:
- a processor, electrically connected with the marking assembly and the measuring structure; and
- a display assembly, electrically connected with the processor, the display assembly comprises a display configured to display a visual measuring datum coincided with the first measuring datum.

13. The distance measuring device of claim 12, wherein the measuring structure comprises a tape assembly comprising:
- a tape; and
- a moving member, slidably arranged on the tape, a surface of the moving member is defined as a third measuring datum.

14. The distance measuring device of claim 12, wherein
the measuring structure comprises a tape assembly comprising a tape; and
the display is configured to display a visual tape, the visual tape is substantially coincided with the tape of the tape assembly.

15. The distance measuring device of claim 1, wherein
the distance measuring device further comprises a processor; and
the measuring structure comprises a laser ranging assembly, the laser ranging assembly comprises:
- a second laser emitting member, electrically connected with the processor and configured to emit a laser beam to the target position; and
- a photoelectric conversion member, electrically connected with the processor and configured to capture an optical signal of a reflected laser beam, convert the optical signal into an electrical signal, and the processor is configured to determine the distance between the initial position and the target position according to the electrical signal.

16. A distance measuring device, configured to measure a distance between an initial position and a target position, wherein the distance measuring device comprises:
- a battery;
- a processor;
- a housing, comprising a front portion, a rear portion and a middle portion; and
- a measuring structure, comprising a laser ranging assembly and a tape assembly, wherein the laser ranging assembly is substantially arranged in the front portion, the tape assembly is substantially arranged in the middle portion, the battery is substantially arranged in the rear portion, and the laser ranging assembly and the tape assembly are both electrically connected with the processor;

wherein the laser ranging assembly comprises:
- a laser emitting member, electrically connected with the processor and configured to emit a laser beam to the target position; and
- a photoelectric conversion member, electrically connected with the processor and configured to capture an optical signal of a reflected laser beam, convert the optical signal into an electrical signal, and the processor is configured to determine the distance between the initial position and the target position according to the electrical signal.

17. A distance measuring method by a distance measuring device,
wherein the distance measuring device is configured to measure a distance between an initial position and a target position; the distance measuring device comprises:
- a marking assembly, configured to generate a mark on the initial position as a first measuring datum; and
- a measuring structure, configured to measure the distance between the initial position and the target position according to the first measuring datum;

wherein the distance measuring method comprises:
- generating, by the marking assembly, the mark on the initial position as t first measuring datum; and
- measuring, by the measuring structure, the distance between the initial position and the target position according to the first measuring datum;

wherein the target position comprises a first target position and a second target position, the measuring structure comprises a laser ranging assembly and a tape assembly, the distance measuring device further comprises a calculating module, the distance measuring method further comprises:
- measuring, by the laser ranging assembly, a third distance between the initial position and the first target position;
- measuring, by the tape assembly, a fourth distance between the initial position and the first target position; and
- calculating, by the calculating module, a fifth distance between the first target position and the second target position according to the third distance and the fourth distance.

18. The distance measuring method of claim 17, wherein the distance measuring device further comprises a switching key and a housing, the housing comprises a back surface defined as a second measuring datum, the distance measuring method further comprises:
- acting on the switching key to switch the second measuring datum as the measuring datum for measuring; and
- acting on the switching key again to switch the first measuring datum as the measuring datum for measuring.

* * * * *